(12) United States Patent
Higashiyama et al.

(10) Patent No.: US 11,293,389 B2
(45) Date of Patent: Apr. 5, 2022

(54) FUEL SUPPLY STRUCTURE FOR SADDLED VEHICLE

(71) Applicant: HONDA MOTOR CO., LTD., Tokyo (JP)

(72) Inventors: Junji Higashiyama, Wako (JP); Takeshi Kamiyama, Wako (JP); Tomoyuki Katayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/557,693

(22) Filed: Aug. 30, 2019

(65) Prior Publication Data

US 2020/0072172 A1   Mar. 5, 2020

(30) Foreign Application Priority Data

Aug. 31, 2018   (JP) .............................. JP2018-163813

(51) Int. Cl.
*F02M 37/00* (2006.01)
*B62M 7/02* (2006.01)
*B62J 37/00* (2006.01)

(52) U.S. Cl.
CPC .......... *F02M 37/0052* (2013.01); *B62J 37/00* (2013.01); *B62M 7/02* (2013.01); *F02M 37/007* (2013.01)

(58) Field of Classification Search
CPC .......... F02M 37/0011; F02M 37/0017; F02M 37/0047; F02M 37/0052; F02M 37/0076; F02M 37/04; F02M 37/00–54; F02M 55/00; F02M 55/004; F02M 69/46; F02M 69/462; B62J 37/00; B62J 35/00; B60K 15/00–10

(Continued)

(56) References Cited

U.S. PATENT DOCUMENTS 4,143,488 A * 3/1979 Ade ....................... F02M 37/04
                                                      417/366
4,351,301 A * 9/1982 Allen ................... F02D 33/006
                                                      123/557

(Continued)

FOREIGN PATENT DOCUMENTS

JP   2006-161763 A   6/2006
JP   2011-252405 A   12/2011
JP   5184479 B2      4/2013

*Primary Examiner* — Robert A Werner
(74) *Attorney, Agent, or Firm* — Birch, Stewart, Kolasch & Birch, LLP

(57) ABSTRACT

A fuel supply structure for a saddled vehicle, includes: an upstream-side fuel supply system guiding fuel from a fuel tank to a fuel pump side; a downstream-side fuel supply system guiding the fuel from the pump to a fuel injection valve side; and an excess fuel return system returning excess fuel from the downstream-side fuel supply system to the tank side. A fuel hose joint is attached to the tank and includes: an insertion tube portion inserted into the tank and formed into a dual tube structure where an inner tube is covered by an outer tube; a first connection tube portion communicating with inside of the inner tube; and a second connection tube portion communicating with inside of the outer tube. A fuel suction hose is connected to one of the first and second connection tube portions, and a fuel return hose is connected to an other thereof.

9 Claims, 15 Drawing Sheets

(58) Field of Classification Search
USPC .......................................... 123/514, 468, 469
See application file for complete search history.

(56) References Cited

U.S. PATENT DOCUMENTS

| | | | | |
|---|---|---|---|---|
| 5,533,486 | A | * | 7/1996 | Qutub .................... F02D 33/006 123/514 |
| 5,601,066 | A | * | 2/1997 | Qutub .................... F02D 33/006 123/514 |
| 6,227,173 | B1 | * | 5/2001 | Bennett .................... F02B 43/00 123/468 |
| 7,243,640 | B2 | | 7/2007 | Kondo |
| 2011/0073073 | A1 | | 3/2011 | Ishii |
| 2011/0073079 | A1 | * | 3/2011 | Ishii ........................ B62J 37/00 123/509 |

* cited by examiner

FUEL SUPPLY STRUCTURE FOR SADDLED VEHICLE

CROSS REFERENCE TO RELATED APPLICATIONS

The present application claims priority under 35 U.S.C. § 119 to Japanese Patent Application No. 2018-163813 filed Aug. 31, 2018 the entire contents of which are hereby incorporated by reference.

BACKGROUND OF THE INVENTION

Field of the Invention

The present invention relates to a fuel supply structure for a saddled vehicle, comprising: a fuel tank; a fuel pump that is disposed outside the fuel tank so as to supply fuel from the fuel tank to a fuel injection valve provided in an internal combustion engine; an upstream side fuel supply system that guides the fuel from the fuel tank to the fuel pump side; a downstream side fuel supply system that guides the fuel from the fuel pump to the fuel injection valve side; and an excess fuel return system that returns excess fuel from the downstream side fuel supply system to the fuel tank side.

Description of the Related Art

In Japanese Patent No. 5184479, there is known a fuel supply device for a two-wheeled motor vehicle in which an upstream side fuel supply system and an excess fuel return system are connected to a fuel tank, the upstream side fuel supply system guiding fuel to a fuel pump that is disposed outside the fuel tank, the excess fuel return system returning excess fuel to the fuel tank side, the excess fuel being out of the fuel guided to a fuel injection valve side from the fuel pump.

However, according to one disclosed in Japanese Patent No. 5184479 described above, individual joints are attached to the fuel tank for every plural hoses connected to the fuel tank which incurs increase of the number of pieces of the components.

SUMMARY OF THE INVENTION

The present invention has been achieved in view of such circumstances, and its object is to provide a fuel supply structure for a saddled vehicle which reduces the number of pieces of joints attached to a fuel tank, and reduces the production cost.

In order to achieve the object, according to a first aspect of the present invention, there is provided a fuel supply structure for a saddled vehicle, comprising: a fuel tank; a fuel pump that is disposed outside the fuel tank so as to supply fuel from the fuel tank to a fuel injection valve provided in an internal combustion engine; an upstream side fuel supply system that guides the fuel from the fuel tank to the fuel pump side; a downstream side fuel supply system that guides the fuel from the fuel pump to the fuel injection valve side; and an excess fuel return system that returns excess fuel from the downstream side fuel supply system to the fuel tank side, wherein a fuel hose joint is attached to the fuel tank, and includes: an insertion tube portion; a first connection tube portion; and a second connection tube portion, the insertion tube portion being formed into a dual tube structure and being inserted into the fuel tank, an inner tube being covered by an outer tube in the dual tube structure, the first connection tube portion communicating with an inside of the inner tube and being disposed outside the fuel tank, the second connection tube portion communicating with an inside of the outer tube and being disposed outside the fuel tank, a fuel suction hose that configures a part of the upstream side fuel supply system is connected to one of the first and second connection tube portions, and a fuel return hose that configures a part of the excess fuel return system is connected to an other of the first and second connection tube portions.

With the first aspect of the present invention, the fuel hose joint is attached to the fuel tank, the fuel hose joint including the insertion tube portion that includes the inner tube and the outer tube and is formed into a dual tube structure, the fuel suction hose and the fuel return hose are connected to the fuel hose joint so as to communicate either of the inner tube and the outer tube, the fuel suction hose configures a part of the upstream side fuel supply system, the fuel return hose configuring a part of the excess fuel return system, therefore the upstream side fuel supply system and the excess fuel return system are configured to be connected to the single fuel hose joint in common, the number of pieces of the joints attached to the fuel pump is reduced, the number of pieces of the components is reduced, and the production cost can be reduced.

According to a second aspect of the present invention, in addition to the first aspect, the fuel return hose is connected to the first connection tube portion of the fuel hose joint that is attached to a bottom portion of the fuel tank, and an upper end outlet opening of the inner tube inside the outer tube is disposed above a lower end of an opening that is arranged in the outer tube.

With the second aspect of the present invention, the fuel return hose is connected to the fuel hose joint so as to communicate with the inner tube of the fuel hose joint, the fuel suction hose is connected to the fuel hose joint so as to communicate with the inside of the outer tube, the fuel hose joint being attached to the bottom portion of the fuel tank, the upper end outlet opening of the inner tube is disposed above the lower end of the opening of the outer tube, therefore the fuel supply port namely the opening of the outer tube and the returning port namely the upper end outlet opening of the inner tube are made adjacent to each other, the fuel supply port guiding the fuel to the fuel pump side, the returning port returning the excess fuel to the fuel tank side, the fuel supply performance at the time the fuel inside the fuel tank reduces is improved, infiltration of the fuel gas component contained in the excess fuel to the fuel supply port is suppressed, and the fuel supply performance is stabilized which can contribute to improvement of the performance of the internal combustion engine.

According to a third aspect of the present invention, in addition to the second aspect, an upper end portion of the outer tube is disposed above the upper end outlet opening of the inner tube, and a mesh screen is arranged in a portion above the upper end outlet opening of the inner tube out of the opening.

With the third aspect of the present invention, the upper end portion of the outer tube is disposed above the upper end outlet opening of the inner tube, the mesh screen is arranged in the opening above the upper end outlet opening of the inner tube, therefore the fuel having returned to the fuel tank side from the upper end outlet opening of the inner tube passes through the mesh screen, thereby surer vapor-liquid separation can be executed, the fuel supply performance at the time the fuel reduces is further improved, and the performance of the internal combustion engine can be further improved. Also, since the mesh screen is not arranged in the opening of the outer tube in a portion on the lower side of the upper end outlet opening of the inner tube, resistance of suction of the fuel inside the fuel tank from the opening into the outer tube is reduced, the fuel returning to the inside of the fuel tank from the inner tube is filtered by the mesh screen, and thereby clogging of the dust, refuse, and the like in the fuel supply hose can be prevented.

According to a fourth aspect of the present invention, in addition to the second aspect or the third aspect, a joint is attached to the bottom portion of the fuel tank at a position apart from the fuel hose joint, the joint including a vertically long opening but being free of a mesh screen, the vertically long opening being separated into plural numbers, extending long in an up-down direction, and opening to an inside of the fuel tank, and a breather hose is connected to the joint, the breather hose returning vapor generated in the fuel pump to the fuel tank side and being capable of supplying fuel of the fuel tank to the fuel pump.

With the fourth aspect of the present invention, the breather hose is connected to the joint, the breather hose returning the vapor to the fuel tank side and being capable of supplying the fuel of the fuel tank to the fuel pump, the joint being attached to the bottom portion of the fuel tank so as to be apart from the fuel hose joint, the joint includes the vertically long opening but is free of the mesh screen, the vertically long opening being separated into plural numbers and opening to the inside of the fuel tank, and therefore large impurities can be prevented from entering into the fuel pump from the fuel tank while preventing failure of returning of the vapor gas by the mesh screen.

According to a fifth aspect of the present invention, in addition to the first aspect to the fourth aspect, a secondary filter and a pressure control valve are arranged in the downstream side fuel supply system, the secondary filter being disposed in a vicinity of the fuel pump so as to remove impurities within fuel that is discharged from the fuel pump, the pressure control valve being disposed in a vicinity of the fuel tank so as to guide excess fuel coming from the downstream side fuel supply system to the excess fuel return system.

With the fifth aspect of the present invention, the secondary filter is disposed in the vicinity of the fuel pump, the secondary filter removing impurities within the fuel which is discharged from the fuel pump, the pressure control valve is disposed in the vicinity of the fuel tank, the pressure control valve guiding excess fuel to the excess fuel return system, therefore the disposal space of the secondary filter and the pressure control valve can be secured by dispersed disposal, and the length of the excess fuel return system can be shortened.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be explained referring to FIG. 1 to FIG. 15 attached. In the following description reference numbers corresponding to components of an exemplary embodiment are included only for ease of understanding, but the applicant's claims are not limited to the exemplary embodiment or to specific components of the exemplary embodiment. In the explanation below, the up, down, front, rear, left, and right are to mean the directions as viewed by an occupant that rides an all terrain vehicle.

First, in FIG. 1, this saddled vehicle is an all-terrain vehicle, and a fuel tank 15, a riding seat 16, and an internal combustion engine E are supported by a body frame F of the saddled vehicle, the riding seat 16 being disposed behind the fuel tank 15, the internal combustion engine E being disposed below the fuel tank 15.

Figure 2:
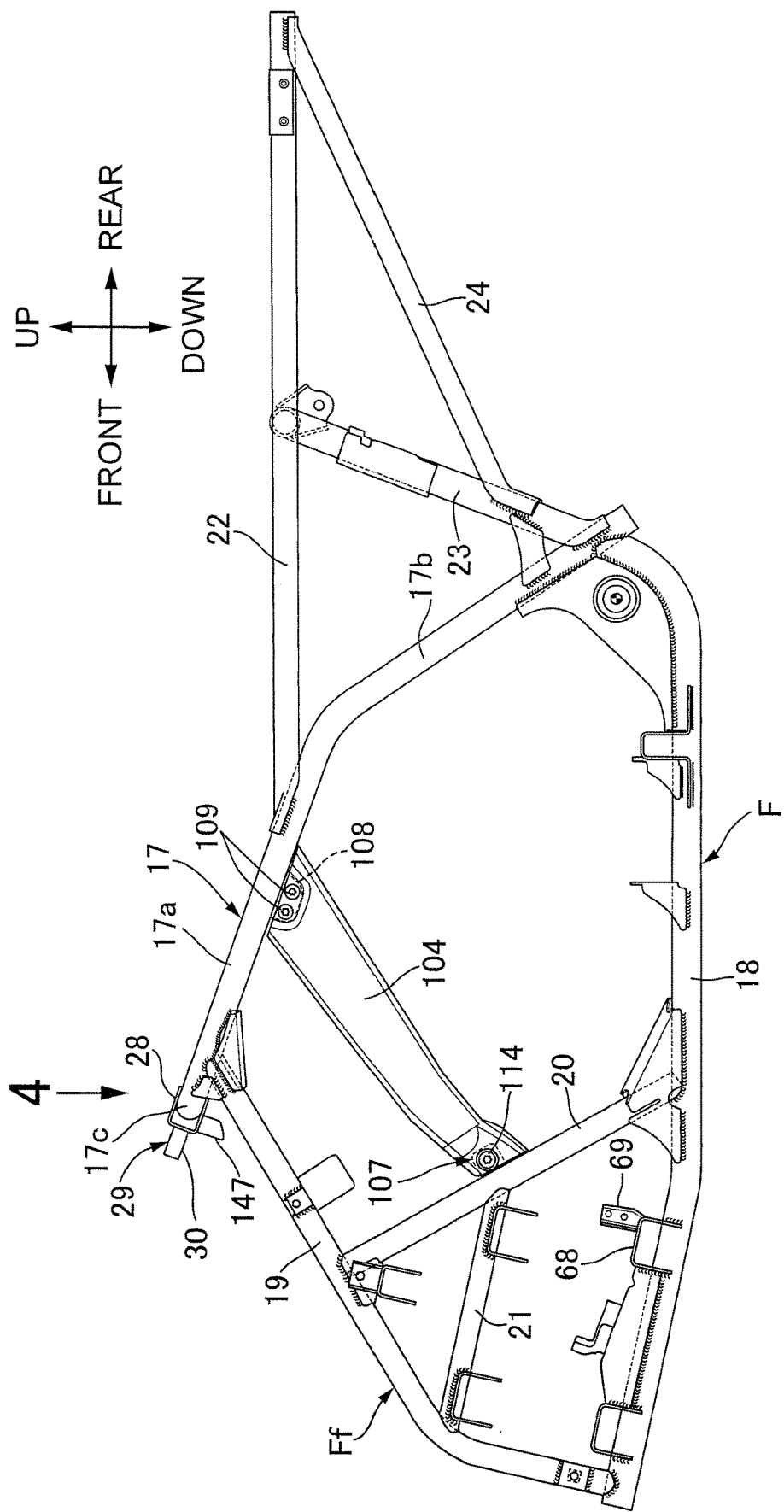
FIG. 2 is a left side view of a body frame.

In FIG. 2, the body frame F is formed by welding and joining plural pieces of frame members including plural pieces of metal pipes, and includes, in this embodiment, a pair of left and right upper frames 17, a pair of left and right lower frames 18, a pair of left and right first front down frames 19, a pair of left and right second front down frames 20, a pair of left and right front sub-frames 21, a pair of left and right rear upper frames 22, a pair of left and right rear down frames 23, and a pair of left and right rear sub-frames 24, the upper frames 17 extending in the vehicle longitudinal direction, the lower frames 18 extending in the vehicle longitudinal direction below the upper frames 17, the rear end portions of the lower frames 18 being joined to the rear end portions of the upper frames 17, the first front down frames 19 inclining downward to the front and connecting the front portions of the upper frames 17 and the front end portions of the lower frames 18 to each other, the second front down frames 20 connecting the intermediate portions of the first front down frames 19 and the intermediate portions of the lower frames 18 to each other and extending downward to the rear, the front sub-frames 21 connecting the intermediate portions close to the lower portion of the first front down frames 19 and the second front down frames 20 to each other and extending in the vehicle longitudinal direction, the front end portions of the rear upper frames 22 being provided successively to the intermediate portions of the upper frames 17, the rear upper frames 22 extending rearward in the vehicle longitudinal direction, the rear down frames 23 inclining downward to the front from the intermediate portions of the rear upper frames 22 and being joined to the rear end portions of the upper frames 17, the rear sub-frames 24 connecting the rear end portions of the upper frames 17 and the rear end portions of the rear upper frames 22 to each other.

The upper frame 17 is formed so as to integrally include a front inclining portion 17a and a rear inclining portion 17b, the front inclining portion 17a slightly inclining downward to the rear, the rear inclining portion 17b continuing to the rear end of the front inclining portion 17a and extending downward to the rear at a steeper angle compared to the front inclining portion 17a. The rear end portion of the lower frame 18 is joined to the lower end portion of the rear inclining portion 17b, the front end portion of the rear upper frame 22 is joined to the rear end portion of the front inclining portion 17a, and the front end portion (the lower end portion) of the rear down frame 23 is joined to the lower end portion of the rear inclining portion 17b.

The fuel tank 15 is supported on the front inclining portion 17a of the upper frame 17, and an engine body 26 of the internal combustion engine E is supported on the lower frame 18. Also, the riding seat 16 is supported by the rear upper frame 22.

Also, with reference to FIG. 3 and FIG. 4, the front end portions of the front inclining portions 17a in the pair of left and right upper frames 17 are successively provided in an integral manner by a bent portion 17c that configures a part of the body frame F and has a substantial U-shape opening rearward below the fuel tank 15. To this bent portion 17c, a steering shaft bracket 28 is fixed by welding, the steering shaft bracket 28 having a cross-section with a substantial U-shape opening rearward. Also, by a support portion 29, a steering shaft 32 is steerably supported, the steering shaft bracket 28 including the support portion 29 on the front surface of the steering shaft bracket 28, the steering shaft 32 configuring a part of a steering system 31 and having a cylindrical shape, the steering system 31 being disposed in front of the fuel tank 15 and the internal combustion engine E so as to steerably operate left and right front wheels WF.

That is, the support portion 29 includes a pair of left and right bosses 30 having a cylindrical shape, the bosses 30 being disposed at an interval in the vehicle width direction and being protrusively provided on the front surface of the steering shaft bracket 28. As explicitly shown in FIG. 3, a front and rear pair of holders 34, 35 are fastened to the bosses 30, the holders 34, 35 holding a bush 33, the steering shaft 32 being inserted to the bush 33. Also, a steering handlebar 36 is connected to the upper end portion of the steering shaft 32.

In the meantime, the pair of left and right front wheels WF are suspended from a front body frame Ff through front suspensions (not illustrated) of an independent suspension type, the front wheels WF being disposed in front of the internal combustion engine E, the front body frame Ff configuring the front portion of the body frame F. In the present embodiment, the front body frame Ff is configured to include at least the front portions of the pair of left and right lower frames 18, the pair of left and right first front down frames 19, the pair of left and right second front down frames 20, and the pair of left and right front sub-frames 21, and the front wheels WF are suspended from the front sub-frames 21 of the front body frame Ff through the front suspensions (not illustrated). Also, a pair of left and right rear wheels WR are suspended from the pair of left and right rear upper frames 22 out of the body frame F through rear suspensions 38 of an independent suspension type.

Figure 1:
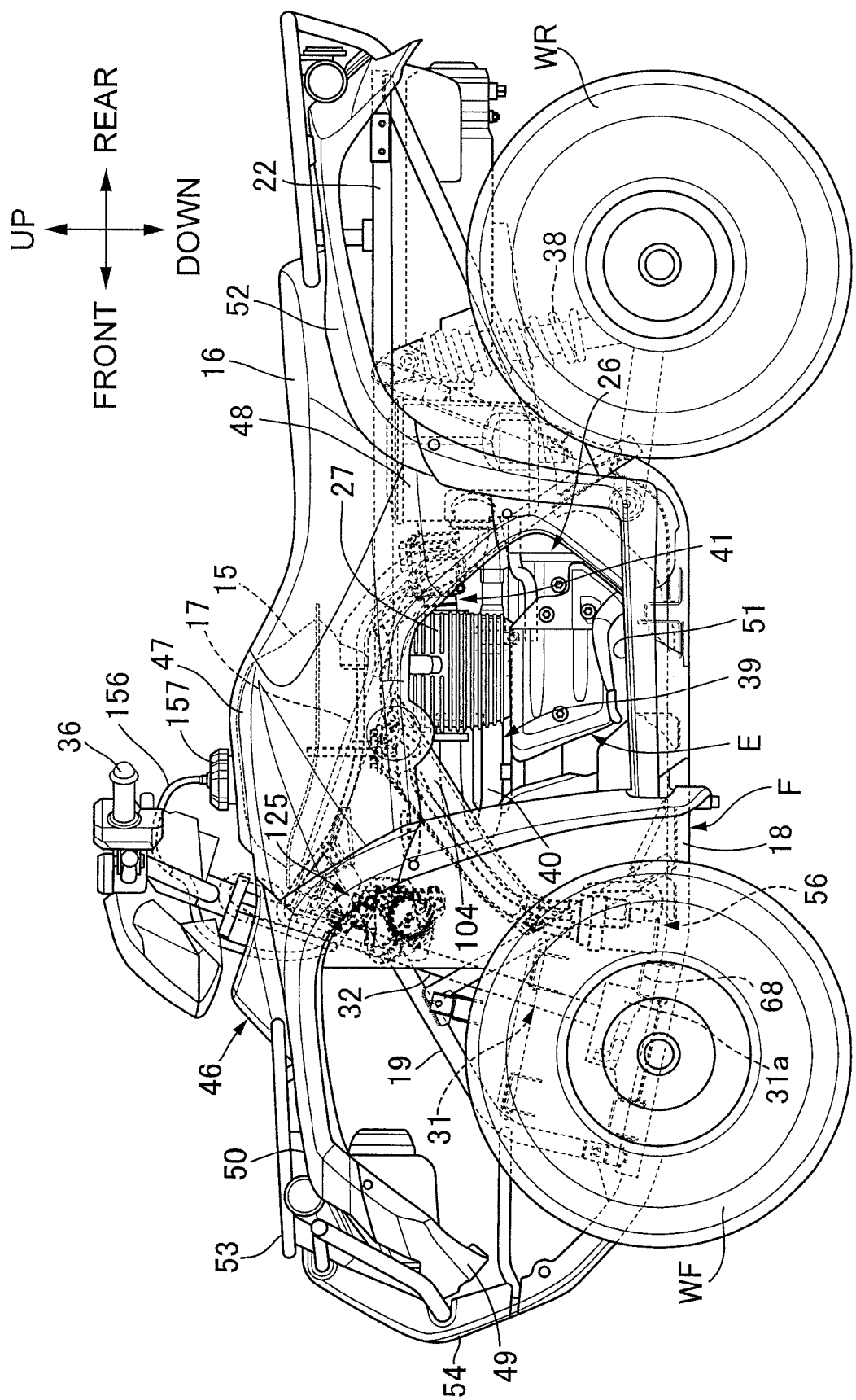
FIG. 1 is a left side view of an all terrain vehicle.
Figure 3:
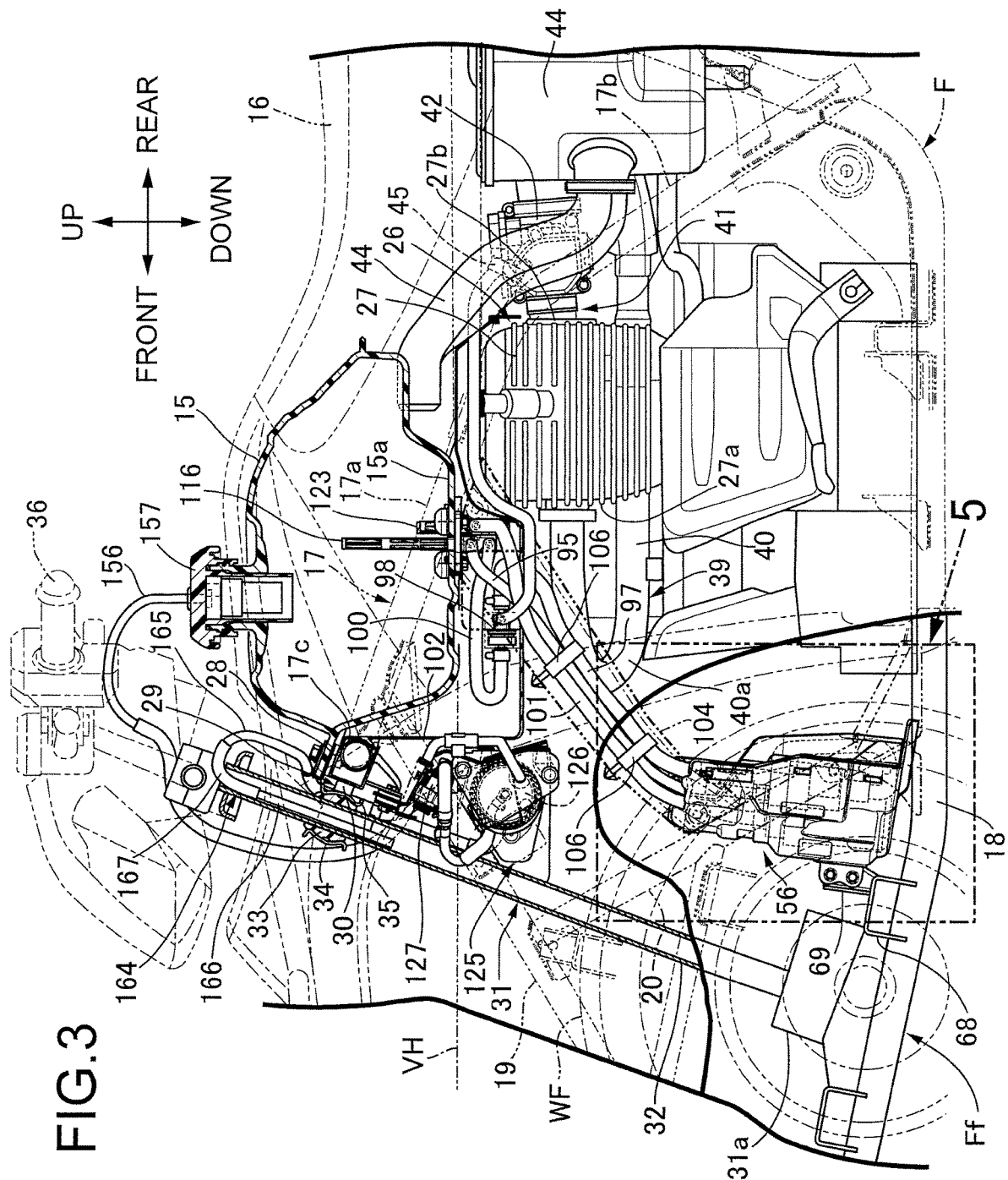
FIG. 3 is a longitudinal sectional left side view of an essential part of the all terrain vehicle.
Figure 4:
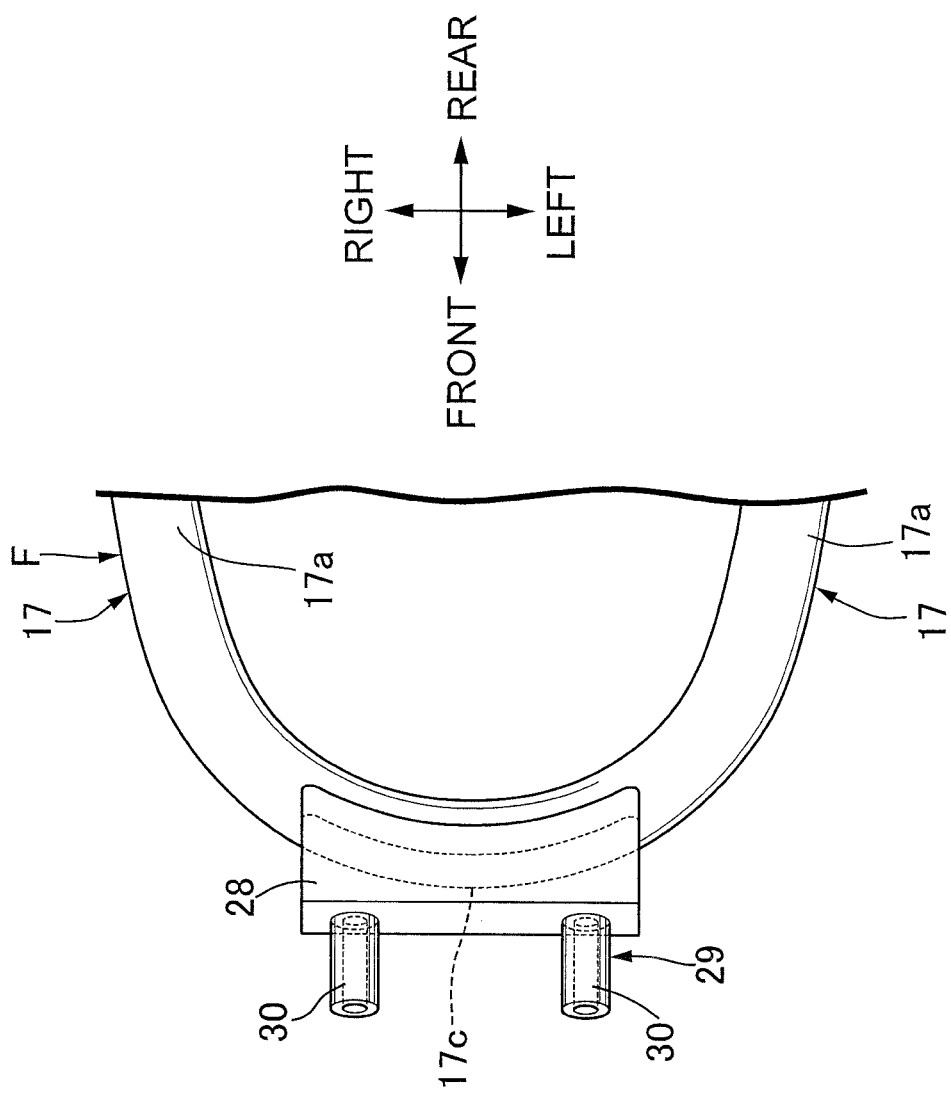
FIG. 4 is a view as viewed along the arrow 4 of FIG. 2.

Watching FIG. 1 and FIG. 3, the internal combustion engine E exerts power that drives the pair of left and right front wheels WF and the pair of left and right rear wheels WR. An exhaust system 39 of the internal combustion engine E includes an exhaust pipe 40 that is connected to a front wall 27a of a cylinder head 27, the cylinder head 27 configuring a part of an engine body 26. In the exhaust pipe 40, a U-shape portion 40a is arranged, the U-shape portion 40a including a front extending portion and a fold-back portion, the front extending portion extending forward from the cylinder head 27, the fold-back portion being folded back rearward and passing the right lateral side of the engine body 26.

Also, an intake system 41 of the internal combustion engine E is extended rearward from a rear wall 27b of the cylinder head 27, and includes a throttle body 42 and an air cleaner 43, the throttle body 42 being connected to the rear wall 27b of the cylinder head 27, the upstream end of the throttle body 42 being connected to the air cleaner 43. An intake duct 44 is connected to the air cleaner 43, the intake duct 44 extending toward the lower portion on the rear side of the fuel tank 15. A fuel injection valve 45 is annexed to the intake system 41. In the present embodiment, the fuel injection valve 45 is attached to the throttle body 42.

The body frame F, the fuel tank 15, the internal combustion engine E, the front wheels WF, and the rear wheels WR are covered by a body cover 46. The body cover 46 includes a tank cover 47, a pair of left and right side covers 48, a pair of left and right front fenders 49, a front cover 50, a pair of left and right steps 51, and a pair of left and right rear fenders 52, the tank cover 47 covering the fuel tank 15 from above, the side covers 48 continuing to both the left and right lateral sides of the tank cover 47 and covering the upper portion and the rear portion of the internal combustion engine E from the lateral sides, the front fenders 49 covering the pair of left and right front wheels WF respectively, the front cover 50 connecting the pair of left and right front fenders 49 to each other, the steps 51 being successively provided to the lower end portions of the side covers 48 and the rear end lower portions of the front fenders 49 so that the occupant riding on the riding seat 16 places the feet on the steps 51, the rear fenders 52 continuing to the rear end portions of the side covers 48 and the rear end portions of the steps 51 and covering the pair of left and right rear wheels WR respectively.

A front carrier 53 is disposed in the front portions of the left and right front fenders 49 and above the front cover 50, and the front carrier 53 is successively provided to a front protector 54 that covers the front fenders 49 and the front cover 50 from the front and is attached to the front end portion of the body frame F namely the front end portion of the front body frame Ff.

Figure 5:
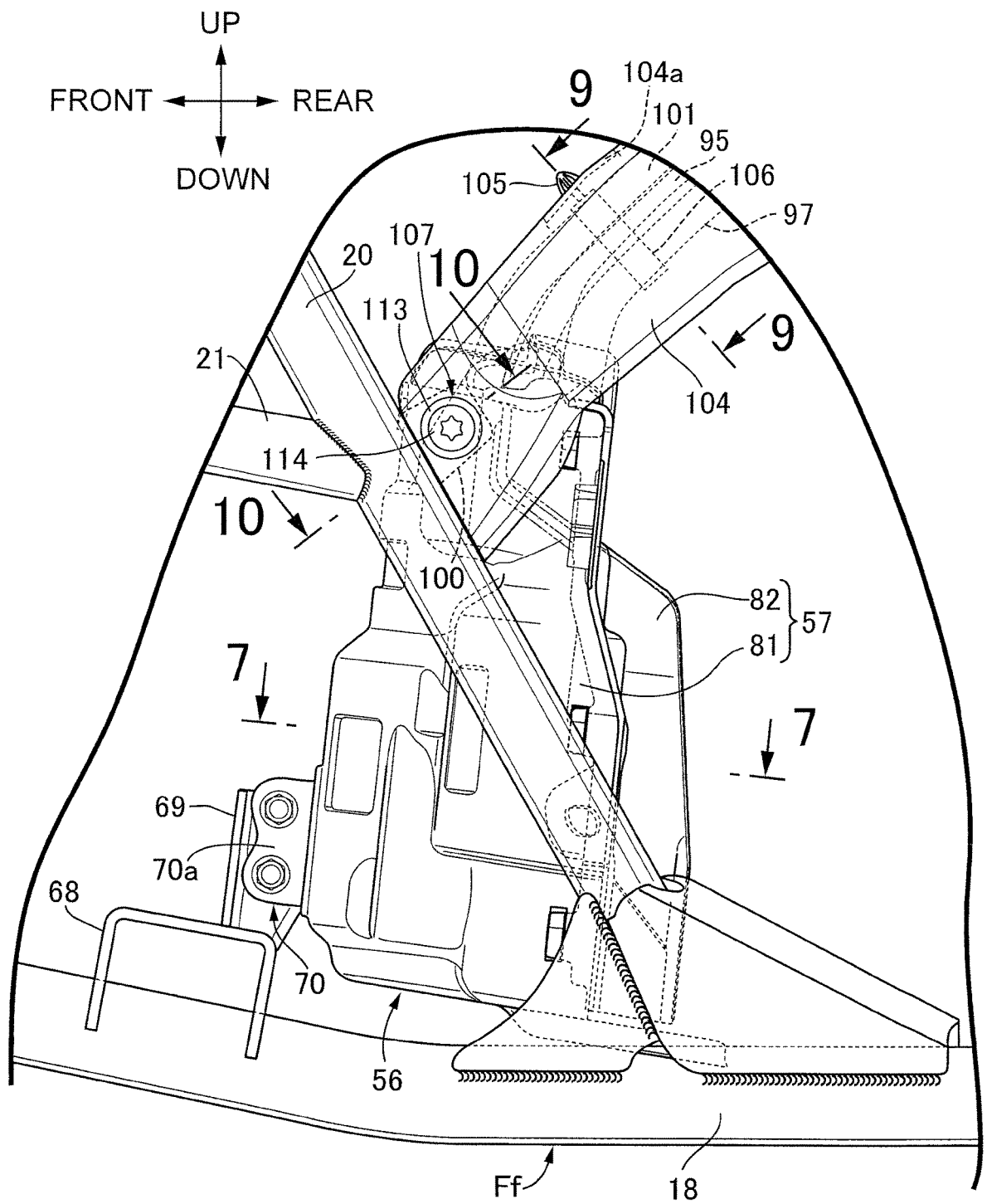
FIG. 5 is an enlarged view of a portion shown by the arrow 5 of FIG. 3.
Figure 6:
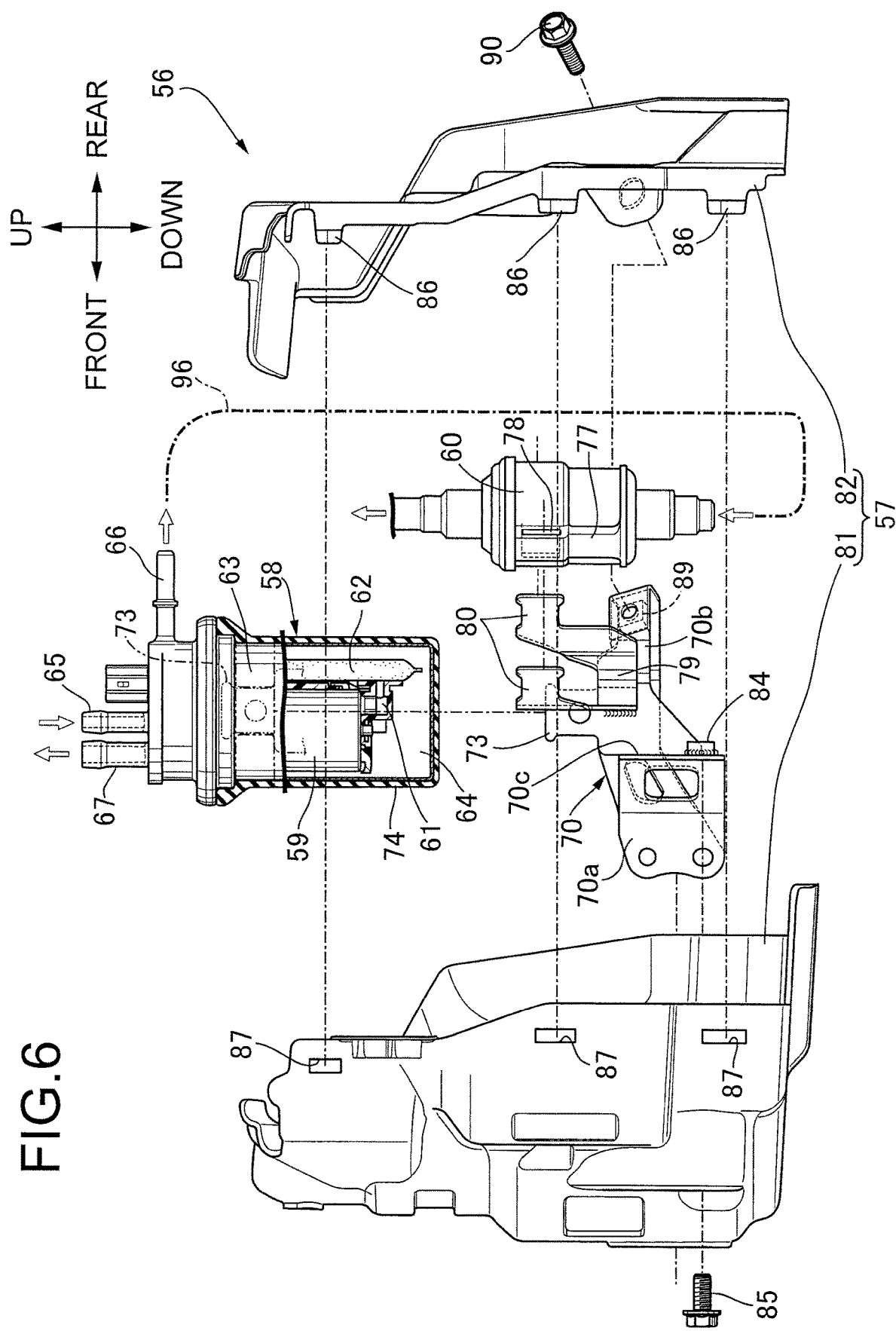
FIG. 6 is an exploded perspective view of a module case, a pump unit, a secondary filter, a first support member, and a second support member.
Figure 7:
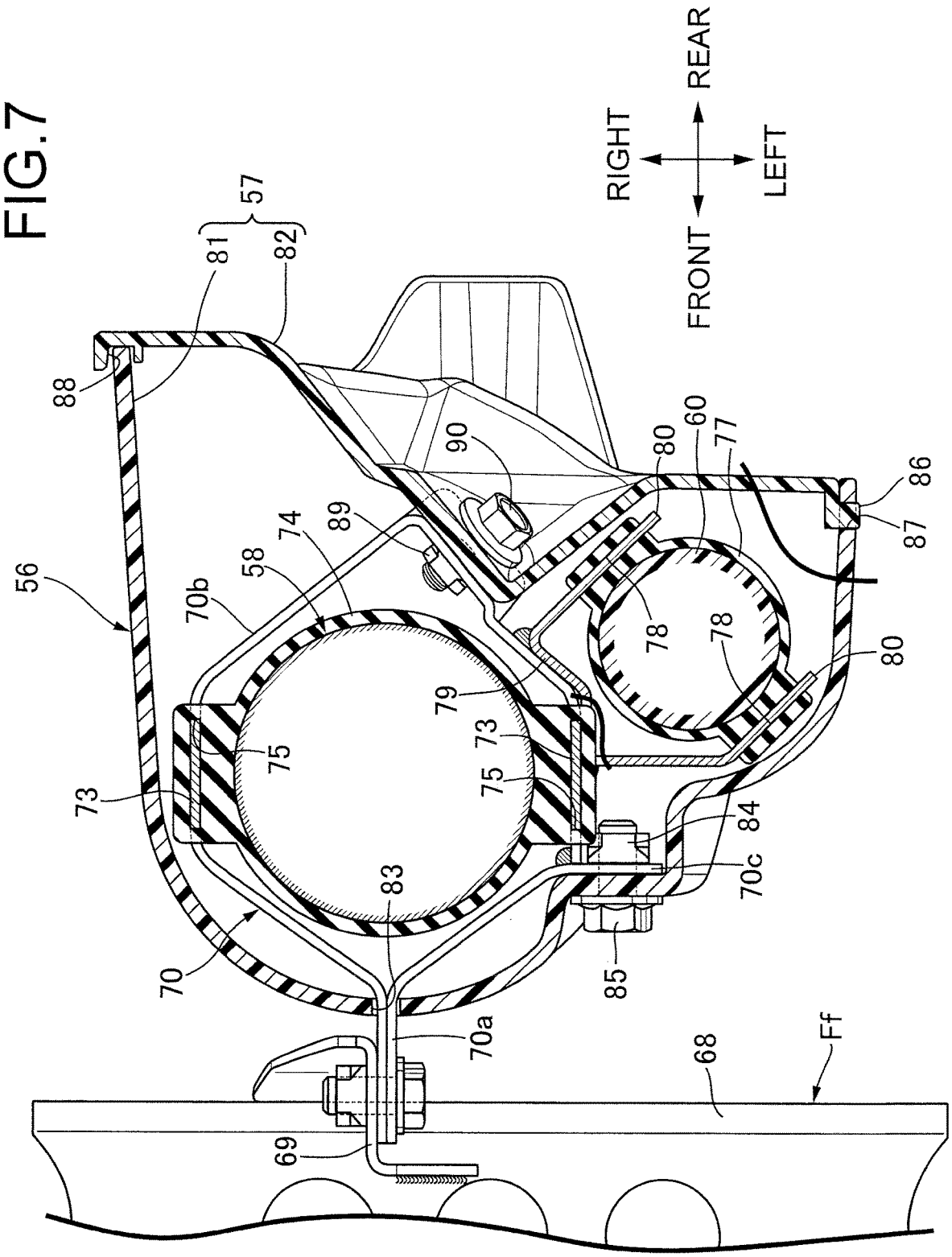
FIG. 7 is a sectional view taken along the line 7-7 of FIG. 5.

Referring also to FIG. 5 to FIG. 7, a fuel pump module 56 is supported by the front body frame Ff that configures the front portion of the body frame F. This fuel pump module 56 is obtained by that a pump unit 58 and a secondary filter 60 are stored inside a module case 57, the secondary filter 60 removing impurities within the fuel discharged from a fuel pump 59 of the pump unit 58.

Watching FIG. 6, the pump unit 58 is obtained by that both of the fuel pump 59 and a primary filter 62 are stored in a pump housing 63, the primary filter 62 being connected to a suction port 61 of the fuel pump 59 so as to remove impurities from the fuel that is sucked to the fuel pump 59. The fuel pump 59 forms a suction chamber 64 inside the pump housing 63 and is stored inside the pump housing 63, the suction chamber 64 storing the primary filter 62.

In the upper end portion of the pump housing 63, a suction pipe 65, a discharge pipe 66, and a vapor exhaust pipe 67 are protrusively provided, the suction pipe 65 extending in the up-down direction so as to suck the fuel into the suction chamber 64, the discharge pipe 66 protruding sideways so as to discharge the fuel from the fuel pump 59, the vapor exhaust pipe 67 returning vapor generated inside the fuel pump 59 to the fuel tank 15 side, allowing the fuel to be supplied from the fuel tank 15 to the fuel pump 59 side, and extending in the up-down direction.

In the meantime, in front of a portion of the lower frame 18 linking with the second front down frame 20, behind a lower end portion 31a of the steering system 31, and between the front portions of the pair of left and right lower frames 18, a cross member 68 is extended, the cross member 68 configuring a part of the front body frame Ff. A first support member 70 is fastened to a first stay 69, the first support member 70 supporting the pump unit 58, the first stay 69 being fixed to a position close to the end portion on the left side in the vehicle width direction of the cross member 68.

The first support member 70 is formed of a metal sheet material that is bendingly formed, and includes a first attaching sheet portion 70a, a pump unit support portion 70b, and a case support portion 70c in an integral manner, the first attaching sheet portion 70a opposing the first stay 69 from the left side in the vehicle width direction, the pump unit support portion 70b being formed so as to surround the pump unit 58 and being continuous with the rear portion of the first attaching sheet portion 70a, the case support portion 70c protruding to the left side in the vehicle width direction from a portion close to the first attaching sheet portion 70a of the pump unit support portion 70b. The first attaching sheet portion 70a is fastened to the first stay 69 by a pair of first bolts 71 and first nuts 72, the first bolts 71 being disposed at an interval in the up-down direction, the first nuts 72 being screwed to the first bolts 71.

In the pump unit support portion 70b in the first support member 70, a pair of first hooks 73 are arranged protrusively so as to protrude upward in an integral manner, the first hooks 73 being disposed on one diametral line along the vehicle width direction of the pump unit 58. Meanwhile, a rubber-made pump holder 74 is mounted on the pump housing 63 of the pump unit 58, the first hooks 73 are inserted from beneath to a pair of first holding holes 75 having a slit shape, the pump holder 74 including the first holding holes 75, and the pump unit 58 is thereby supported by the first support member 70, the pump unit 58 being disposed inside the pump unit support portion 70b. Thus, the pump unit 58 namely the fuel pump 59 comes to be supported by the front body frame Ff at a position overlapping with the front wheel WF as seen in the side view.

The secondary filter 60 is disposed on the left rear side of the pump unit 58, a rubber-made filter holder 77 is mounted on the secondary filter 60, and a pair of second holding holes 78 having a slit shape are formed in the filter holder 77, the second holding holes 78 inclining to a direction that becomes the right side in the vehicle width direction as it goes toward the front.

A second support member 79 is fixingly attached to a portion facing the secondary filter 60 side of the pump unit support portion 70b in the first support member 70, the second support member 79 being formed by bending a metal sheet material, the second support member 79 includes a pair of second hooks 80 at the tip end portion and is formed into a substantial U-shape, the second hooks 80 are inserted to the second holding holes 78, and thereby the secondary filter 60 comes to be supported by the second support member 79.

The module case 57 includes a first case member 81 made of a synthetic resin and a second case member 82 made of a synthetic resin, the first case member 81 being formed into a bowl shape that is opened in the rear side so as to cover the pump unit 58 and the secondary filter 60 from the front in the vehicle longitudinal direction and being disposed on the rear side of the cross member 68, the second case member 82 closing the opening end of the first case member 81 from the rear side in the vehicle longitudinal direction. In the first case member 81, a slit-shape through hole 83 is formed, the first attaching sheet portion 70a of the first support member 70 being inserted to the through hole 83. Also, a second bolt 85 is screwed to a first weld nut 84, the second bolt 85 being inserted to the first case member 81 and the case support portion 70c, the first weld nut 84 being fixingly attached to the case support portion 70c of the first support member 70, and thereby the first case member 81 is fixed to the first support member 70.

Three pieces of locking craws 86 are protrusively arranged at intervals in the up-down direction in the end portion of the left side in the vehicle width direction of the second case member 82, the locking craws 86 protruding to the left side in the vehicle width direction, and locking holes 87 are formed in the opening end portion of the left side of the first case member 81, the locking craws 86 respectively engaging with the locking holes 87. Also, a groove 88 is formed so as to extend in the up-down direction in the end portion of the right side in the vehicle width direction of the second case member 82, the groove 88 receiving the opening end portion of the right side of the first case member 81, a third bolt 90 is screwed to a second weld nut 89 that is fixingly attached to the pump unit support portion 70b of the first support member 70, the third bolt 90 being inserted to the second case member 82 and the pump unit support portion 70b, and thereby the second case member 82 is fixed to the first support member 70, the second case member 82 being positioned and held by the first case member 81.

Thus, although the module case 57 is disposed on the rear side of the cross member 68 and is fixed to the first support member 70, the cross member 68 is disposed on the rear side of the lower end portion 31a of the steering system 31, and the module case 57 comes to be disposed in the vicinity of the rear of the lower end portion 31a of the steering system 31.

Figure 8:
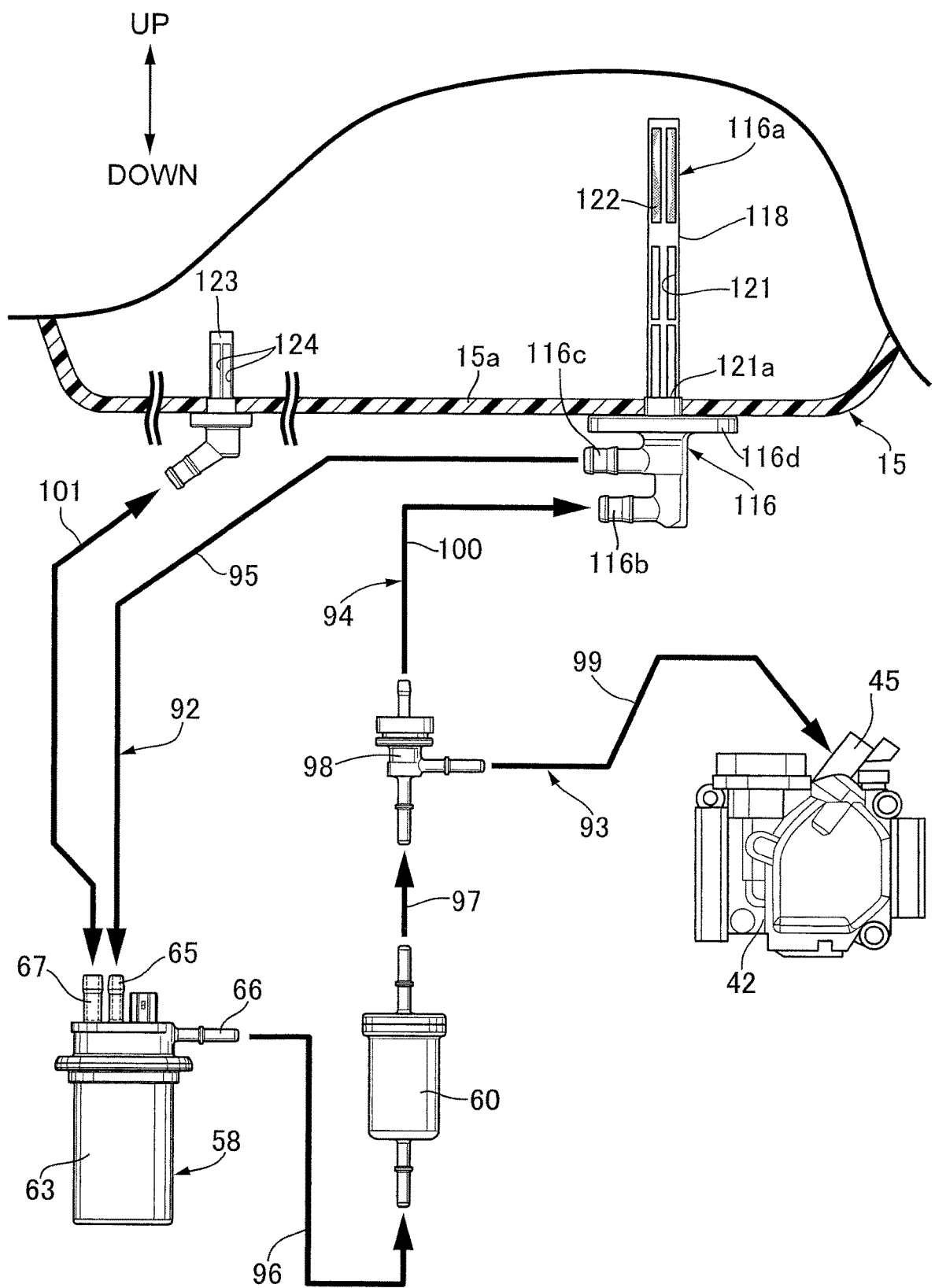
FIG. 8 is a schematic view that shows a configuration of a fuel supply system.

In FIG. 8, an upstream side fuel supply system 92 is arranged between the fuel tank 15 and the fuel pump 59, the upstream side fuel supply system 92 guiding the fuel to the fuel pump 59 side, a downstream side fuel supply system 93 is arranged between the fuel pump 59 and the fuel injection valve 45, the downstream side fuel supply system 93 guiding the fuel from the fuel pump 59 to the fuel injection valve 45 side, and an excess fuel return system 94 is arranged between the downstream side fuel supply system 93 and the fuel tank 15, the excess fuel return system 94 returning the excess fuel to the fuel tank 15 side.

The upstream side fuel supply system 92 is configured with a fuel suction hose 95, the suction chamber 64, and the primary filter 62, the fuel suction hose 95 allowing the fuel pump 59 to suck the fuel coming from the fuel tank 15, the suction chamber 64 being formed inside the pump unit 58, and the downstream end portion of the fuel suction hose 95 having flexibility is connected to the suction pipe 65 of the pump unit 58.

Also, the downstream side fuel supply system 93 includes a first fuel discharge hose 96, the secondary filter 60, a second fuel discharge hose 97, a pressure control valve 98, and a third fuel discharge hose 99, the upstream end portion of the first fuel discharge hose 96 being connected to the discharge pipe 66 of the pump unit 58, the secondary filter 60 being connected to the downstream end portion of the first fuel discharge hose 96, the upstream end portion of the second fuel discharge hose 97 being connected to the secondary filter 60, the second fuel discharge hose 97 being extended to the fuel tank 15 side, the pressure control valve 98 being connected to the downstream end portion of the second fuel discharge hose 97, the upstream end portion of the third fuel discharge hose 99 being connected to the pressure control valve 98, the third fuel discharge hose 99 being extended to the fuel injection valve 45 side of the intake system 41.

The excess fuel return system 94 guides the fuel having become excessive to the fuel tank 15 side by pressure regulation of the pressure control valve 98, and includes a fuel return hose 100, the upstream end portion of the fuel return hose 100 being connected to the pressure control valve 98.

Also, to the vapor exhaust pipe 67 of the pump unit 58, the upstream end portion of a breather hose 101 is connected, the breather hose 101 being extended to the fuel tank 15 side so as to allow vapor generated inside the fuel pump 59 to be returned to the fuel tank 15 side and allowing the fuel to be supplied from the fuel tank 15 to the fuel pump 59 side.

In the meantime, the secondary filter 60 is disposed in the vicinity of the fuel pump 59 in the pump unit 58 and is stored inside the module case 57 along with the fuel pump 59, whereas the pressure control valve 98 is disposed in the vicinity of the fuel tank 15. In the present embodiment, as explicitly shown in FIG. 3, the pressure control valve 98 is disposed below the fuel tank 15 and at a position adjacent to a bottom portion 15a of the fuel tank 15 so as to be stored inside a tank heat insulation cover 102 to avoid exertion of the thermal impact from the internal combustion engine E to the fuel tank 15, the tank heat insulation cover 102 covering the bottom portion 15a of the fuel tank 15 from beneath.

Although the fuel tank 15 is supported by the front inclining portions 17a in the pair of left and right upper frames 17 that configure a part of the body frame F, a protection member 104 formed of a metal sheet material is extended between the front inclining portion 17a of the upper frame 17 on the left side and the second front down frame 20 on the left side in the front body frame Ff so as to pass the front of the engine body 26 as seen in the side view, and this protection member 104 is disposed so as to pass the lateral side of the front end portion of the U-shape portion 40a that is arranged in the exhaust pipe 40 of the internal combustion engine E.

In the inner lateral side of the protection member 104, the fuel suction hose 95, the second fuel discharge hose 97, and the breather hose 101 are disposed, the fuel suction hose 95 sucking the fuel from the fuel tank 15 to the fuel pump 59 side, the second fuel discharge hose 97 continuing to the secondary filter 60, the breather hose 101 returning the vapor generated inside the fuel pump 59 to the fuel tank 15 side and being capable of supplying the fuel from the fuel tank 15 to the fuel pump 59 side, and the fuel suction hose 95, the second fuel discharge hose 97, and the breather hose 101 are covered by the protection member 104 from the outer lateral side.

Figure 9:
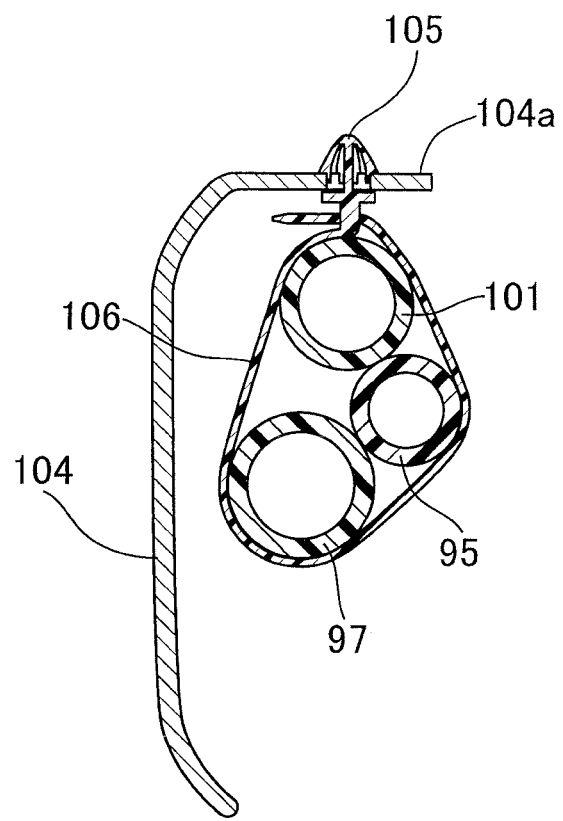
FIG. 9 is a sectional view taken along the line 9-9 of FIG. 5.

Referring also to FIG. 9, at two positions with an interval in the longitudinal direction of the protection member 104, the fuel suction hose 95, the second fuel discharge hose 97, and the breather hose 101 are bundled by hose bands 106 that include first clips 105, and the fuel suction hose 95, the second fuel discharge hose 97, and the breather hose 101 are locked to the protection member 104 by engaging the first clips 105 to a pair of support sheet portions 104a that are arranged in the upper portion of the protection member 104 in an integral manner.

At least one of opposite end portions of the protection member 104 is attached to at least one of the front inclining portion 17a in the upper frame 17 on the left side and the second front down frame 20 on the left side in the front body frame Ff by a rubber mount structure 107. In the present embodiment, the front end portion (the lower end portion) of the protection member 104 is attached to the second front down frame 20 on the left side by the rubber mount structure 107, and the rear end portion (the upper end portion) of the protection member 104 is fastened securely by a pair of fourth bolts 109 to a second stay 108 that is arranged in the lower portion of the front inclining portion 17a of the upper frame 17 on the left side.

Figure 10:
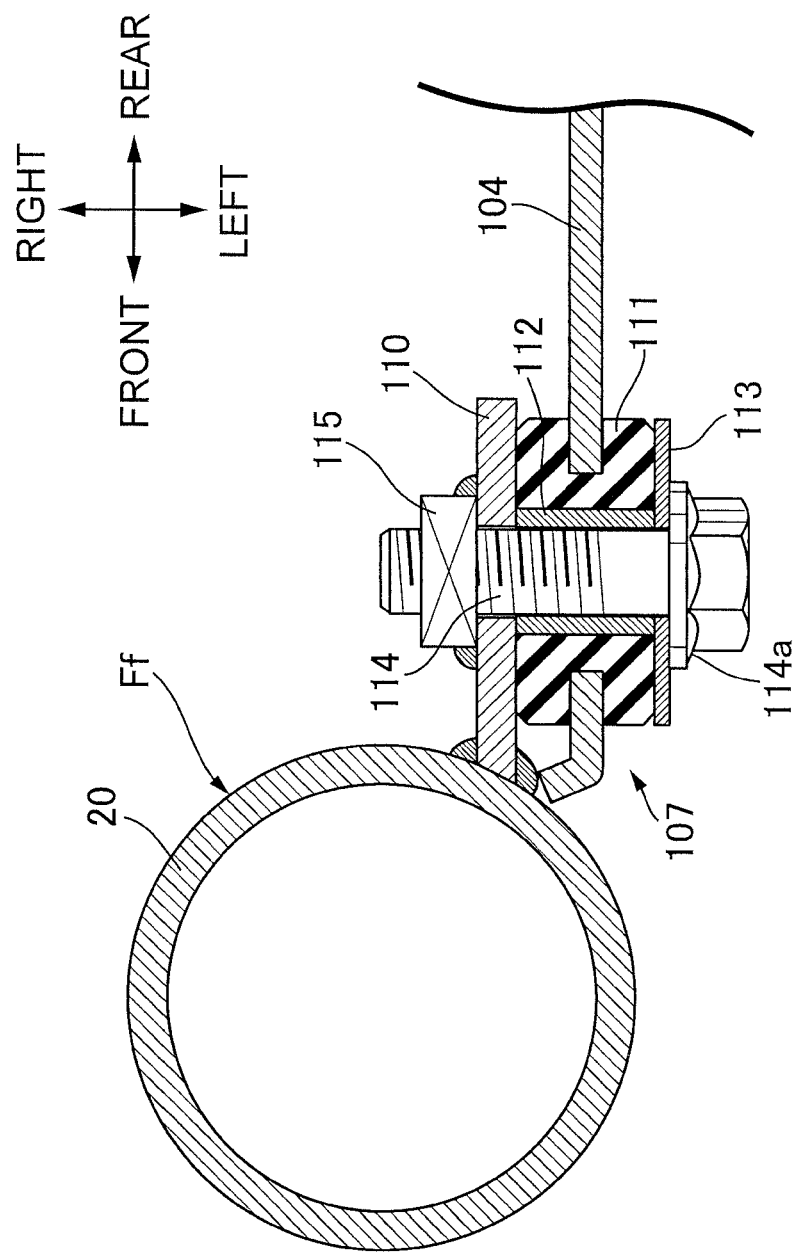
FIG. 10 is a sectional view taken along the line 10-10 of FIG. 5.

In FIG. 10, a third stay 110 is fixingly attached to the second front down frame 20 on the left side, and the protection member 104 is attached to this third stay 110 by the rubber mount structure 107.

The rubber mount structure 107 is configured with a first mount rubber 111, a collar 112 having a cylindrical shape, a washer 113, a fifth bolt 114, and a third weld nut 115, the first mount rubber 111 being mounted on the front end portion (the lower end portion) of the protection member 104, the collar 112 being inserted to the first mount rubber 111 so as to make one end portion of the collar 112 abut against the third stay 110, the washer 113 abutting against the other end portion of the collar 112 sandwiching the first mount rubber 111 between the third stay 110 and the washer 113, the fifth bolt 114 being inserted to the collar 112 and the third stay 110 while allowing an enlarged diameter head portion 114a to abut against and engage with the washer 113, the third weld nut 115 being fixingly attached to the third stay 110 so as to allow the fifth bolt 114 to be screwed to the third weld nut 115.

Figure 11:
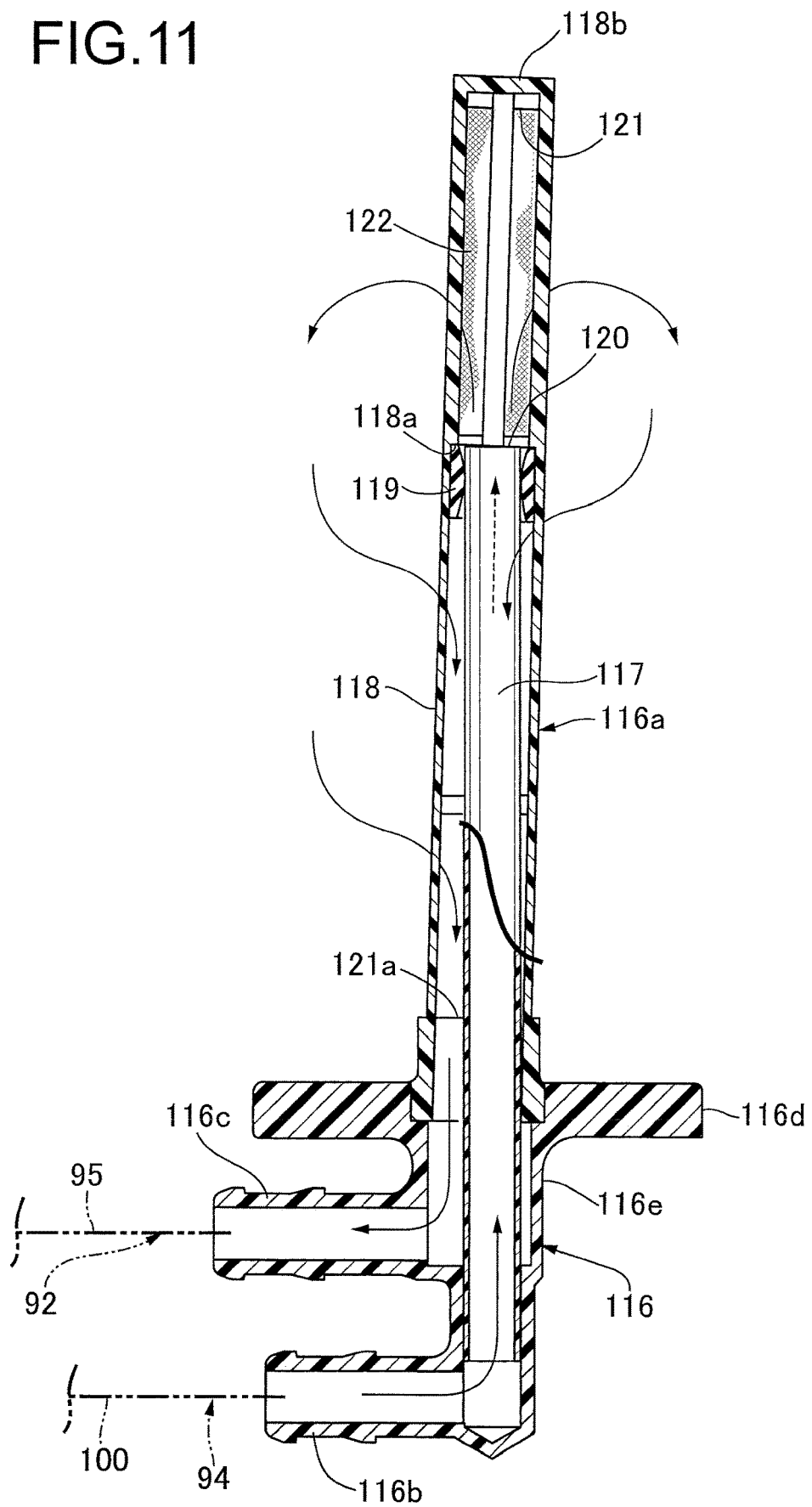
FIG. 11 is a longitudinal sectional view of a fuel hose joint.
Figure 12:
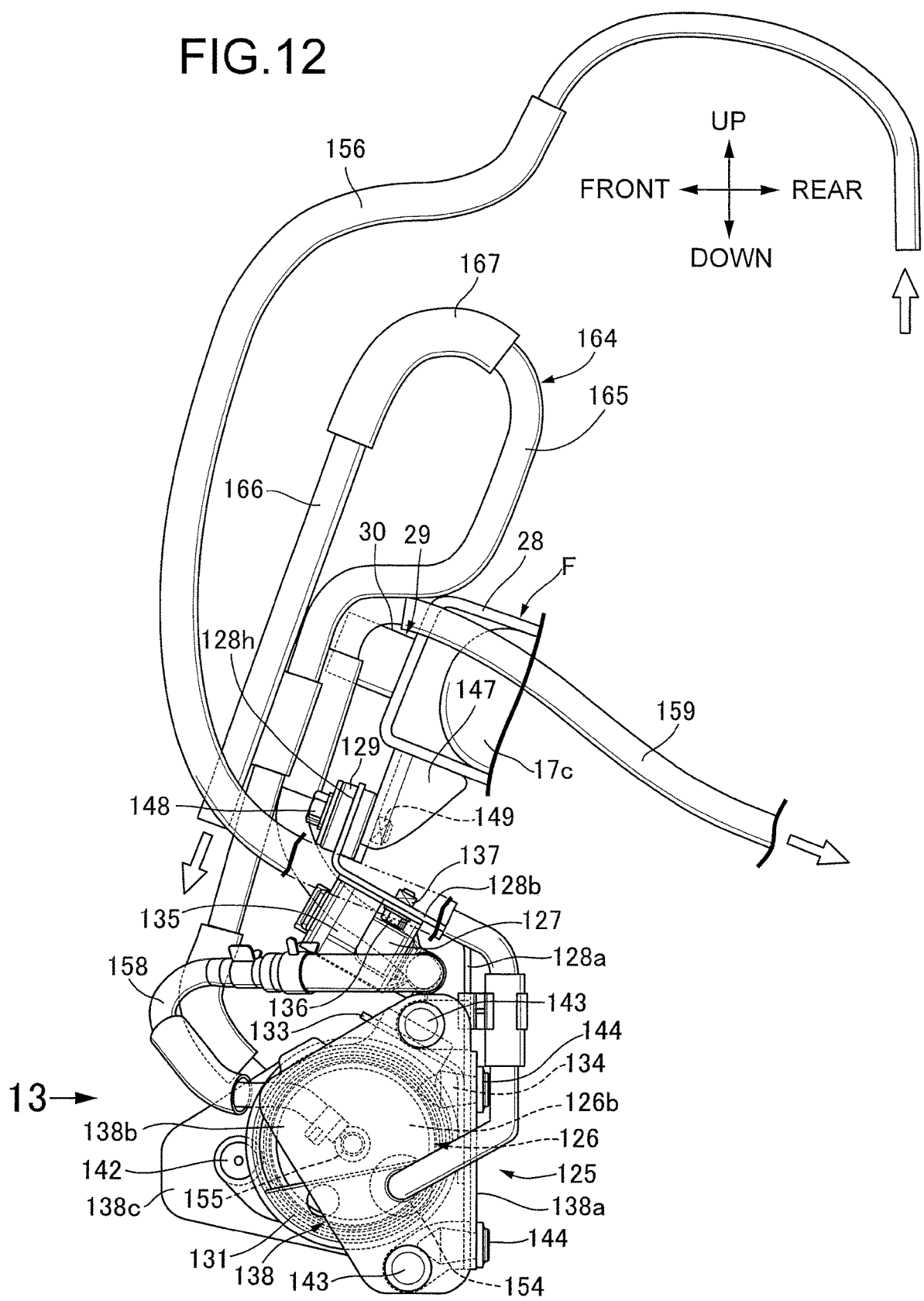
FIG. 12 is a left side view of a canister, an evaporated fuel control valve, and a vicinity thereof.
Figure 13:
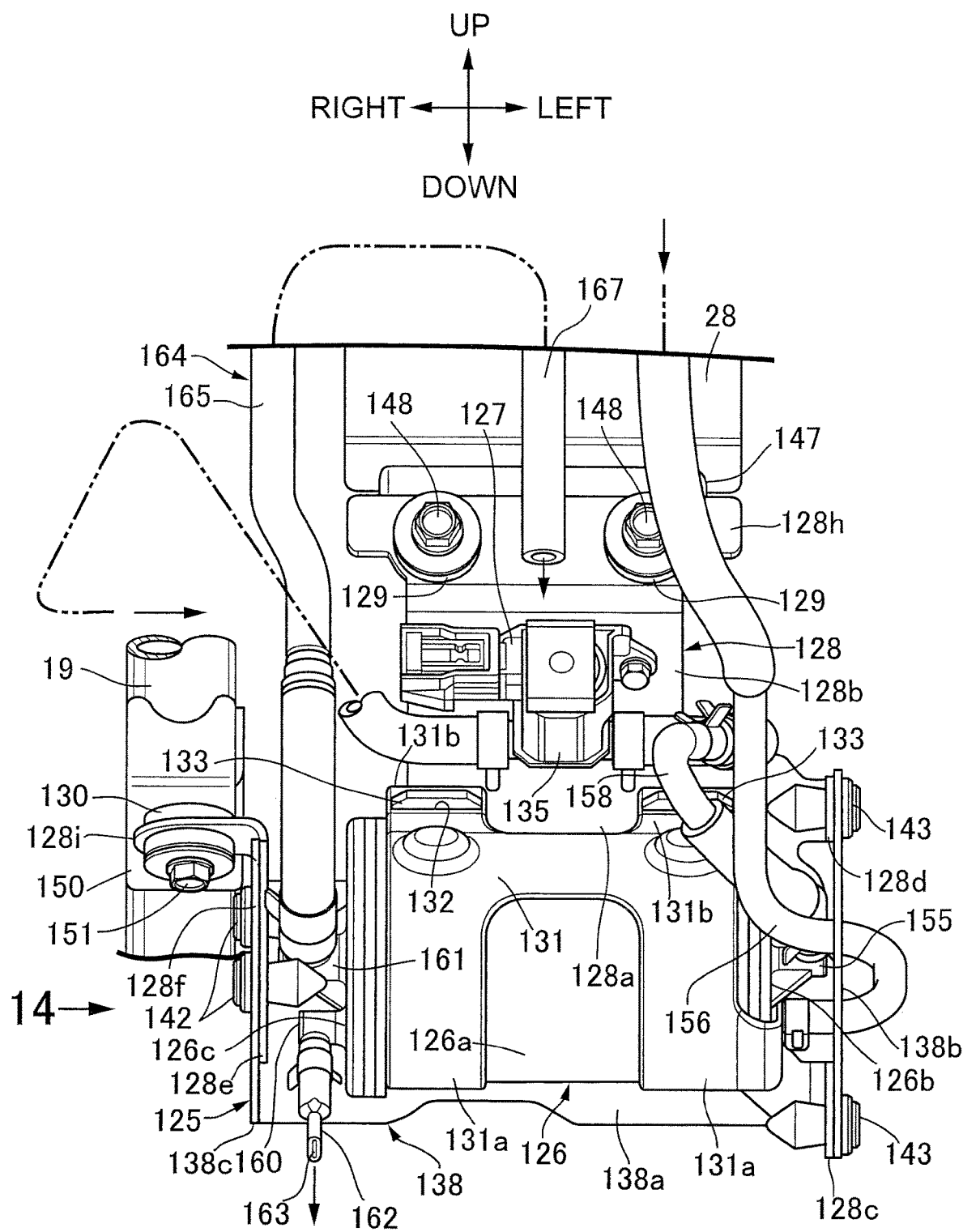
FIG. 13 is a view as viewed along the arrow 13 of FIG. 12.
Figure 14:
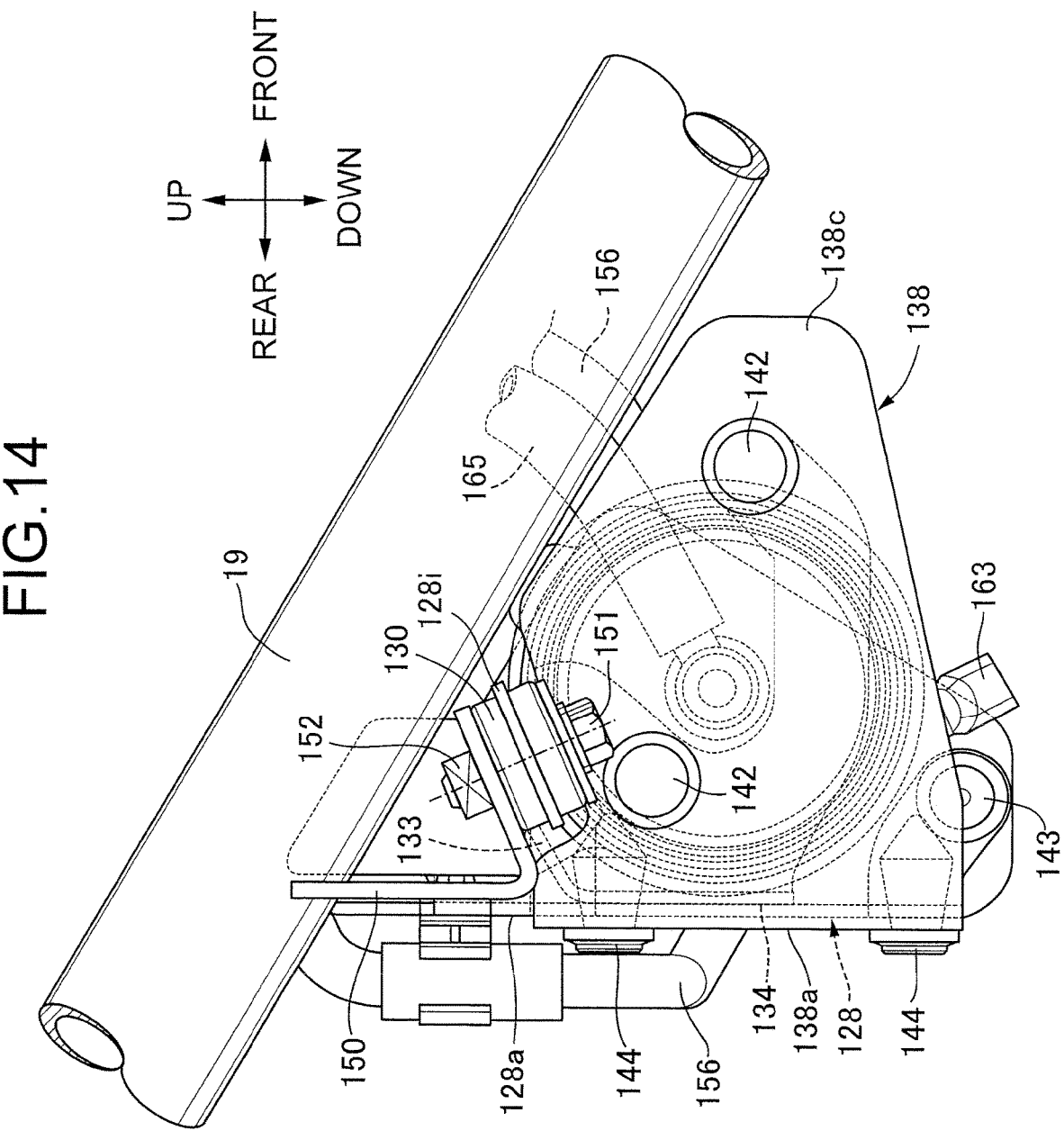
FIG. 14 is a view as viewed along the arrow 14 of FIG. 13.
Figure 15:
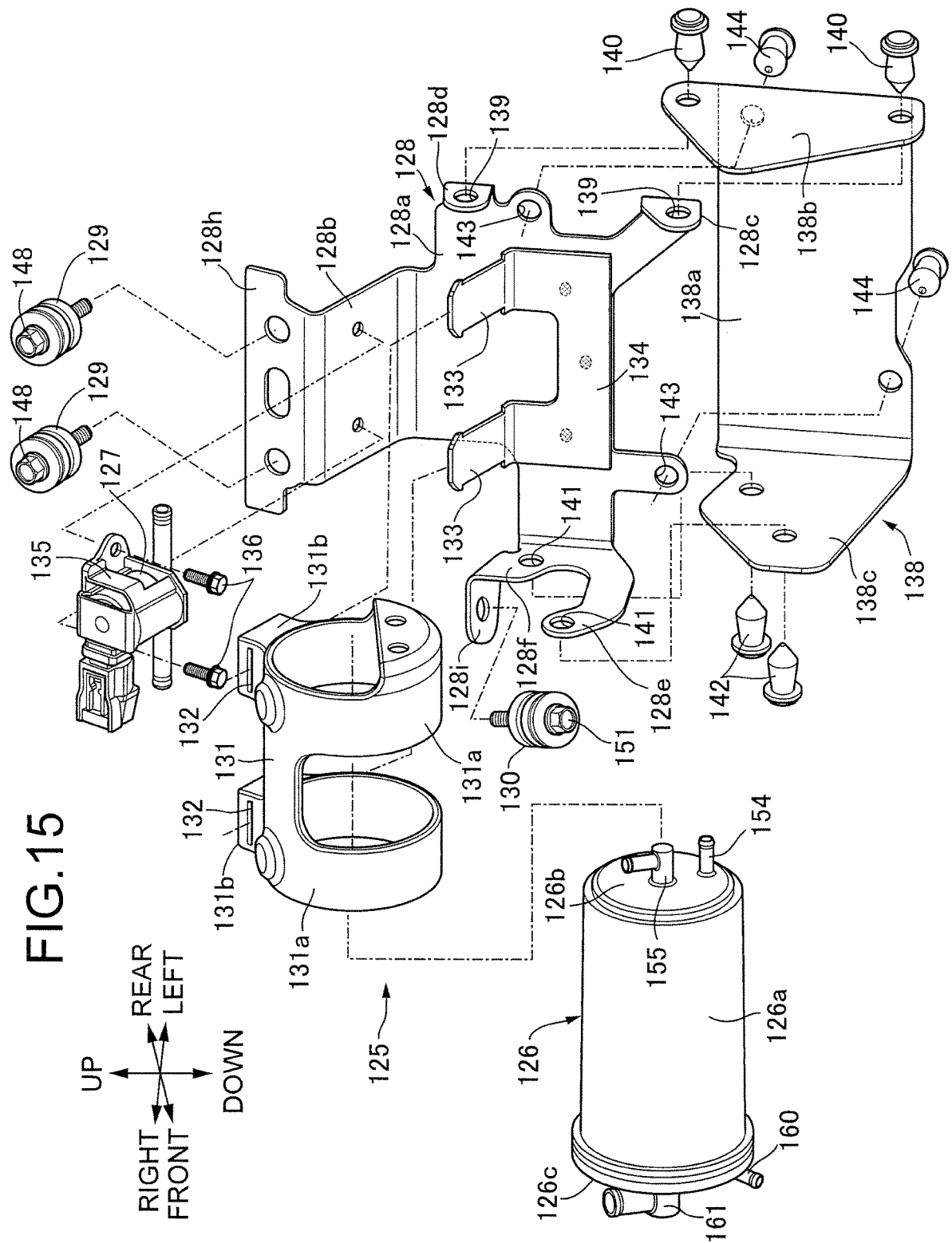
FIG. 15 is an exploded perspective view of the canister, the evaporated fuel control valve, a bracket, and a cover member.

Referring also to FIG. 11, to the bottom portion 15a of the fuel tank 15, a fuel hose joint 116 is attached, the fuel hose joint 116 including an insertion tube portion 116a, a first connection tube portion 116b, and a second connection tube portion 116c, the insertion tube portion 116a being formed into a dual tube structure and being inserted into the fuel tank 15, an inner tube 117 being covered by an outer tube 118 in the dual tube structure, the first connection tube portion 116b communicating with the inside of the inner tube 117 and being disposed outside the fuel tank 15, the second connection tube portion 116c communicating with the inside of the outer tube 118 and being disposed outside the fuel tank 15.

The fuel hose joint 116 includes a flange portion 116d and a bottomed cylindrical portion 116e, the flange portion 116d being fastened to the bottom portion 15a of the fuel tank 15 from beneath, the bottomed cylindrical portion 116e being formed into a bottomed cylindrical shape with the lower end portion being closed and extending downward from the flange portion 116d, the lower end portion of the outer tube 118 is fitted to and fixingly attached to the center portion of the flange portion 116d, and the inner tube 117 is fittingly fixed to a position that is decentered from the outer tube 118 of the lower portion of the bottomed cylindrical portion 116e and is extended upward inside the outer tube 118. Also, in the intermediate portion in the up-down direction of the outer tube 118, an annular step portion 118a facing the below is formed, and the upper end portion of the inner tube 117 is fittingly fixed to a ring member 119 that is fitted into the outer tube 118 so as to be received by the annular step portion 118a. Also, the inner tube 117 includes an upper end outlet opening 120 at the upper end of the inner tube 117, and an upper end portion 118a of the outer tube 118 is disposed on the upper side of the upper end outlet opening 120 of the inner tube 117.

Further, although an opening 121 is arranged in the outer tube 118, the upper end outlet opening 120 is disposed on the upper side of a lower end 121a of the opening 121. Also, a mesh screen 122 is arranged in a portion on the upper side of the upper end outlet opening 120 of the inner tube 117 out of the opening 121.

The first connection tube portion 116b is successively provided to the lower end portion of the bottomed cylindrical portion 116e in an integral manner so as to communicate with the lower end of the inner tube 117 and protrudes sideways from the bottomed cylindrical portion 116e, and the second connection tube portion 116c is successively provided to the intermediate portion in the up-down direction of the bottomed cylindrical portion 116e in an integral manner so as to communicate with the lower end portion of the outer tube 118 and protrudes sideways from the bottomed cylindrical portion 116e.

The fuel suction hose 95 is connected to one of the first and second connection tube portions 116b, 116c, the fuel suction hose 95 configuring a part of the upstream side fuel supply system 92, and the fuel return hose 100 is connected to the other of the first and second connection tube portions 116b, 116c, the fuel return hose 100 configuring a part of the excess fuel return system 94. In the present embodiment, the fuel return hose 100 is connected to the first connection tube portion 116b, and the fuel suction hose 95 is connected to the second connection tube portion 116c.

To a portion that is apart from the fuel hose joint 116 of the bottom portion 15a of the fuel tank 15, a joint 123 is attached separately from the fuel hose joint 116 as explicitly shown in FIG. 8. Although this joint 123 includes a vertically long opening 124 that is separated into plural numbers, extends long in the up-down direction, and opens to the inside of the fuel tank 15, the joint 123 does not include a mesh screen, and the breather hose 101 is connected to the joint 123, the breather hose 101 returning the vapor generated in the fuel pump 59 to the fuel tank 15 side and being capable of supplying the fuel from the fuel tank 15 to the fuel pump 59 side.

Referring also to FIG. 12 to FIG. 15, an evaporated fuel control unit 125 is attached to the body frame F around the fuel tank 15. This evaporated fuel control unit 125 includes a canister 126, an evaporated fuel control valve 127, and a bracket 128, the canister 126 adsorbing evaporated fuel that comes from the fuel tank 15, the evaporated fuel control valve 127 controlling the flow rate of the evaporated fuel that is purged from the canister 126 and flows through the intake system 41 of the internal combustion engine E, the bracket 128 supporting the canister 126 and the evaporated fuel control valve 127 in common, and the bracket 128 is attached to the body frame F through second and third mount rubbers 129, 130, the bracket 128 being disposed around the fuel tank 15.

The bracket 128 is formed of a metal sheet material that is bendingly formed, and is formed so as to include first and second support sheet portions 128a, 128b that face directions different from each other and are formed into a planar shape. In the present embodiment, the bracket 128 includes the first support sheet portion 128a and the second support sheet portion 128b in an integral manner, the first support sheet portion 128a extending in the up-down direction, the second support sheet portion 128b continuing to the upper portion of the first support sheet portion 128a at an angle while slightly inclining upward to the front.

The canister 126 is supported by the first support sheet portion 128a with an attitude of directing the longitudinal direction of the canister 126 to the vehicle width direction namely with a side wall 126a of the canister 126 opposing the first support sheet portion 128a, the side wall 126a having a cylindrical shape, a canister holder 131 is mounted on the canister 126, the canister holder 131 including a pair of ring portions 131a that surround the canister 126, and third holding holes 132 having a slit shape are respectively formed in projection portions 131b that are provided protrusively in the ring portion 131a respectively in an integral manner. Meanwhile, a third support member 134 is welded to the first support sheet portion 128a, the third support member 134 including a pair of third hooks 133 and being formed into a substantial U-Shape, the third hooks 133 are inserted to the third holding holes 132, and thereby the canister 126 is supported by the first support sheet portion 128a.

Also, the evaporated fuel control valve 127 is held by a holding frame 135 that is formed so as to cover the evaporated fuel control valve 127, and this holding frame 135 is held to the second support sheet portion 128b by a pair of sixth bolts 136 and fourth weld nuts 137 that are fixingly attached to the outer surface of the second support sheet portion 128b.

Also, the bracket 128 includes a pair of first cover support portions 128c, 128d having a flat sheet shape and a pair of second cover support portions 128e, 128f having a flat sheet shape in an integral manner, the first cover support portions 128c, 128d continuing to the first support sheet portion 128a at the right angle so as to be disposed on the outer side of one end wall (an end wall on the left side in the vehicle width direction in the present embodiment) 126b of the canister 126, the second cover support portions 128e, 128f continuing to the first support sheet portion 128a at the right angle so as to be disposed on the outer side of the other end wall (an end wall on the left side in the vehicle width direction in the present embodiment) 126c of the canister 126, and a rubber-made cover member 138 having a flat sheet shape is attached to a pair of the first cover support portions 128c, 128d and a pair of the second cover support portions 128e, 128f, the cover member 138 covering at least a part of the side wall 126a and the opposite end walls 126b, 126c of the canister 126.

The cover member 138 has a flat sheet shape in a natural state where an external force is not applied, and can be bent to include a side wall cover portion 138a having a flat sheet shape, a first end wall cover portion 138b, and a second end wall cover portion 138c when the cover member 138 is assembled to the bracket 128, the side wall cover portion 138a abutting against the first support sheet portion 128a from the outer side, the first end wall cover portion 138b continuing to the side wall cover portion 138a at the right angle so as to oppose the one end wall 126b of the canister 126, the second end wall cover portion 138c continuing to the side wall cover portion 138a at the right angle so as to oppose the other end wall 126c of the canister 126.

A first attaching hole 139 is formed in a pair of the first cover support portions 128c, 128d respectively, and the first end wall cover portion 138b is attached to the first cover support portions 128c, 128d by a pair of second clips 140 that are snappingly engaged with the first attaching holes 139 respectively. Also, a second attaching hole 141 is formed in a pair of the second cover support portions 128e, 128f respectively, and the second end wall cover portion 138c is attached to the second cover support portions 128e, 128f by third clips 142 that are snappingly engaged with the second attaching holes 141 respectively. Also, a third attaching hole 143 is formed in the intermediate portion in the up-down direction of the left side in the vehicle width direction of the first support sheet portion 128a and in the lower portion of the right side in the vehicle width direction of the first support sheet portion 128a respectively, and the side wall cover portion 138a is attached to the first support sheet portion 128a by fourth clips 144 that are snappingly engaged with the third attaching holes 143 respectively.

Also, the bracket 128 includes a second attaching sheet portion 128h in an integral manner, the second attaching sheet portion 128h continuing to the upper portion of the second support sheet portion 128b and slightly inclining upward to the rear at an angle close to substantially the right angle, and the second attaching sheet portion 128h is fastened to the front surface of a fourth stay 147 through the second mount rubbers 129 by a pair of seventh bolts 148 as a pair of fastening members and fifth weld nuts 149, the fourth stay 147 being fixed to the lower surface of the steering shaft bracket 28 and extending downward, the seventh bolts 148 being disposed so as to be apart from each other in the vehicle width direction.

That is, the second mount rubbers 129 are mounted on two positions that are apart from each other in the vehicle width direction of the second attaching sheet portion 128h, the seventh bolts 148 are screwed and fastened to the fifth weld nuts 149, the seventh bolts 148 being inserted to the second mount rubbers 129 and the fourth stay 147, the fifth weld nuts 149 being fixingly attached to the rear surface of the fourth stay 147, and thereby the second attaching sheet portion 128h is fastened to the front surface of the fourth stay 147.

Also, to the second cover support portion 128f that is disposed on the upper side out of a pair of second cover support portions 128e, 128f, a third attaching sheet portion 128i is successively provided in an integral manner and at the right angle, the third attaching sheet portion 128i extending in the vehicle width direction. Meanwhile, to the intermediate portion of the first front down frame 19 of the right side out of the pair of left and right first front down frames 19 that configure a part of the front body frame Ff, a fifth stay 150 is fixingly attached, the fifth stay 150 opposing the third attaching sheet portion 128i, and the third attaching sheet portion 128i is fastened to the fifth stay 150 through the third mount rubber 130 by a sixth weld nut 152 and an eighth bolt 151, the sixth weld nut 152 being fixingly attached to the fifth stay 150.

That is, the third mount rubber 130 is mounted on the third attaching sheet portion 128i, the eighth bolt 151 is screwed and fastened to the sixth weld nut 152 that is fixingly attached to the fifth stay 150, the eighth bolt 151 being inserted to the third mount rubber 130 and the fifth stay 150, and thereby the third attaching sheet portion 128i is fastened to the fifth stay 150.

Although the bracket 128 is attached to the body frame F around the fuel tank 15 and the canister 126 and the evaporated fuel control valve 127 are supported by the bracket 128 as described above, in a state of attaching the bracket 128 to the body frame F, as explicitly shown in FIG. 3, the canister 126 is disposed between the steering shaft 32 and the fuel tank 15 and on the lower side of an imaginary horizontal plane VH, the steering shaft 32 extending in the up-down direction while inclining downward to the front in front of the fuel tank 15, the imaginary horizontal plane VH passing the lowermost surface of the fuel tank 15.

Also, the evaporated fuel control valve 127 is disposed between the steering shaft 32 and the fuel tank 15 and on the upper side of the imaginary horizontal plane VH.

In one end wall 126b of the canister 126, a charging connection tube 154 and a purging connection tube 155 are protrusively provided. A charging hose 156 extends upward between the bracket 128 and the fuel tank 15 as seen in the side view, bends to the front side of the steering shaft 32, extends upward further, bends rearward from above the steering shaft 32, and is connected to an oil filler cap 157 of the upper portion of the fuel tank 15 as explicitly shown in FIG. 3, one end portion of the charging hose 156 continuing to the charging connection tube 154.

Also, one end portion of a first purging hose 158 is continuous to the purging connection tube 155, the other end portion of the first purging hose 158 is connected to the evaporated fuel control valve 127, a second purging hose 159 is extended to the intake system 41 side of the internal combustion engine E, the upstream end portion of the second purging hose 159 being connected to the evaporated fuel control valve 127, and the other end portion of the second purging hose 159 is connected to the intake system 41.

A drain connection tube 160 is protrusively provided in the lower portion of the other end wall 126c of the canister 126, and an external air introduction connection tube 161 is protrusively provided in the other end wall 126c so as to be disposed on the upper side of the drain connection tube 160, the external air introduction connection tube 161 being for preventing the pressure inside the canister 126 from becoming a negative pressure and the purge resistance from increasing at the time of purging the evaporated fuel to the intake system 41 at the time of opening the evaporated fuel control valve 127.

To the drain connection tube 160, a drain hose 162 is connected, the drain hose 162 extending downward from the drain connection tube 160, the lower end portion of the drain hose 162 being narrowed so that a lower end opening 163 comes to have a slit shape.

Also an external air relief hose 164 is configured to include a first hose 165 and a second hose 166, the external air relief hose 164 being connected to the external air introduction connection tube 161, the first hose 165 extending upward from the canister 126 along the steering shaft 32, the second hose 166 being folded back in a substantial U-shape from the upper end of the first hose 165, being inserted into the steering shaft 32, and being held inside the steering shaft 32, and a connection pipe 167 having a substantial U-shape is disposed at the upper end opening of the steering shaft 32 so that a part of the connection pipe 167 is inserted into the steering shaft 32, the connection pipe 167 connecting the first and second hoses 165, 166 to each other.

In the meantime, the canister 126 and the evaporated fuel control valve 127 are attached to the bracket 128 so as to configure the evaporated fuel control unit 125 along with plural pipe lines that are connected to the canister 126 and the evaporated fuel control valve 127 namely the charging hose 156, the first purging hose 158, the second purging hose 159, and the external air relief hose 164.

Next, the operation of the present embodiment will be explained. The fuel pump 59 is supported by the front body frame Ff, the fuel pump 59 being disposed at a position where at least a part of the fuel pump 59 overlaps with the front wheel Wf as seen in the side view, the front body frame Ff suspending the front wheel WF and configuring the front portion of the body frame F, the front wheel WF being disposed in front of the internal combustion engine E, the fuel tank 15 is supported on the pair of left and right upper frames 17 that configure a part of the body frame F and are continuous to the front body frame Ff, the protection member 104 is extended between the upper frame 17 on the left side and the front body frame Ff, the protection member 104 passing in front of the engine body 26 as seen in the side view, the fuel suction hose 95 is covered by the protection member 104 from the outer lateral side and is locked to the protection member 104, the fuel suction hose 95 sucking the fuel to the fuel pump 59 side, the fuel coming from the fuel tank 15; therefore, the fuel pump 59 can be protected while minimizing thermal impact from the internal combustion engine E on the fuel pump 59 and securing the degree of freedom of disposal by disposing the fuel pump 59 to be apart from the internal combustion engine E, the fuel suction hose 95 can be protected since the fuel suction hose 95 is locked to the protection member 104 while being covered by the protection member 104, and the degree of freedom of disposal can be further improved so as to position the fuel suction hose 95 by the protection member 104.

Also, since at least one of opposite end portions of the protection member 104 formed of a metal sheet material is attached to at least one of the upper frame 17 on the left side and the front body frame Ff by the rubber mount structure 107, the fuel suction hose 95 can be protected securely since the protection member 104 is formed of a metal sheet material, a change in the stiffness balance of the body frame F caused by the protection member 104 that is disposed in either of the left and right of the body frame F can be absorbed by the rubber mount structure 107, and securing of the protection strength of the fuel suction hose 95 and optimization of the vehicle body balance can be achieved.

Also, since the fuel pump 59 and the secondary filter 60 are stored in the common module case 57 and the module case 57 is disposed in the vicinity of the rear of the lower end portion 31a of the steering system 31 that is disposed in front of the fuel tank 15 and the internal combustion engine E, the secondary filter 60 removing impurities in the fuel that is discharged from the fuel pump 59, the fuel pump 59 and the secondary filter 60 can be protected by the steering system 31 along with the module case 57, thermal impact from the internal combustion engine E with respect to the fuel pump 59 and the secondary filter 60 inside the module case 57 can be reduced further, and maintainability of the secondary filter 60 can be improved.

Also, the internal combustion engine E includes the exhaust pipe 40, the U-shape portion 40a being arranged in the exhaust pipe 40, the U-shape portion 40a having a U-shape including the forward extending portion and the fold-back portion, the forward extending portion extending forward from the engine body 26, the fold-back portion being folded back rearward, the fuel suction hose 95 is covered by the protection member 104, the fuel suction hose 95 having flexibility, the protection member 104 being disposed so as to pass the lateral side of the front end portion of the U-shape portion 40a; therefore, the fuel suction hose 95 can be disposed so as to secure a predetermined distance between the exhaust pipe 40 and the fuel suction hose 95, and the fuel suction hose 95 hardly becomes an obstacle at the time of maintenance since the fuel suction hose 95 has flexibility.

Also, the internal combustion engine E includes the intake system 41, the intake system 41 extending rearward from the engine body 26, the fuel injection valve 45 being annexed to the intake system 41, the second fuel discharge hose 97 is covered by the protection member 104 from the outer lateral side, the second fuel discharge hose 97 guiding the fuel from the secondary filter 60 to the fuel injection valve 45 side of the intake system 41, and therefore, by protecting the fuel suction hose 95 and the second fuel discharge hose 97 by the common protection member 104, increase of the number of pieces of the components can be avoided.

Also, the breather hose 101 is extended to the fuel tank 15 side while being protected by the protection member 104 from the outer lateral side, the breather hose 101 guiding the vapor generated inside the fuel pump 59 to the fuel tank 15 and being capable of supplying the fuel of the fuel tank 15 to the fuel pump 59 side, and therefore, by protecting the breather hose 101 in addition to the fuel suction hose 95 and the second fuel discharge hose 97 by the common protection member 104, increase of the number of pieces of the components can be avoided.

In the meantime, the fuel hose joint 116 is attached to a bottom portion 15b of the fuel tank 15, the fuel hose joint 116 including the insertion tube portion 116a, the first connection tube portion 116b, and the second connection tube portion 116c, the insertion tube portion 116a being formed into a dual tube structure and being inserted into the fuel tank 15, the inner tube 117 being covered by the outer tube 118 in the dual tube structure, the first connection tube portion 116b communicating with the inside of the inner tube 117 and being disposed outside the fuel tank 15, the second connection tube portion 116c communicating with the inside of the outer tube 118 and being disposed outside the fuel tank 15, the fuel suction hose 95 is connected to one of the first and second connection tube portions 116b, 116c, the fuel suction hose 95 being arranged between the fuel tank 15 and the fuel pump 59 and configuring a part of the upstream side fuel supply system 92 that guides the fuel to the fuel pump 59 side, the fuel return hose 100 is connected to the other of the first and second connection tube portions 116b, 116c, the fuel return hose 100 being arranged between the downstream side fuel supply system 93 and the fuel tank 15 and configuring a part of the excess fuel return system 94, the downstream side fuel supply system 93 guiding the fuel from the fuel pump 59 to the fuel injection valve 45 side, the excess fuel return system 94 returning the excess fuel to the fuel tank 15 side; therefore, the upstream side fuel supply system 92 and the excess fuel return system 94 are configured to be connected to the single fuel hose joint 116 in common, the number of pieces of the joints attached to the fuel tank 15 is reduced, the number of pieces of the components is reduced, and the production cost can be reduced.

Also, the fuel return hose 100 is connected to the first connection tube portion 116b of the fuel hose joint 116 that is attached to the bottom portion 15a of the fuel tank 15, the fuel suction hose 95 is connected to the second connection tube portion 116c, the upper end outlet opening 120 of the inner tube 117 inside the outer tube 118 is disposed on the upper side of the lower end 121a of the opening 121 that is arranged in the outer tube 118, and therefore the fuel supply port guiding the fuel to the fuel pump 59 side namely the opening 121 of the outer tube 118 and the returning port returning the excess fuel to the fuel tank 15 side namely the upper end outlet opening 120 of the inner tube 117 are made adjacent to each other, the fuel supply performance at the time the fuel inside the fuel tank 15 reduces is improved, infiltration of the fuel gas component contained within the excess fuel to the opening 121 is suppressed, and the fuel supply performance is stabilized which can contribute to improvement of the performance of the internal combustion engine E.

Also, the upper end portion 118b of the outer tube 118 is disposed on the upper side of the upper end outlet opening 120 of the inner tube 117, the mesh screen 122 is arranged in a portion on the upper side of the upper end outlet opening 120 of the inner tube 117 out of the opening 121, and therefore the fuel having returned to the fuel tank 15 side from the upper end outlet opening 120 of the inner tube 117 passes through the mesh screen 122, thereby surer vapor-liquid separation can be executed, the fuel supply performance at the time the fuel reduces is further improved, and the performance of the internal combustion engine E can be further improved. Also, since the mesh screen is not arranged in the opening 121 of the outer tube 118 in a portion on the lower side of the upper end outlet opening 120 of the inner tube 117, resistance of suction of the fuel inside the fuel tank 15 from the opening 121 into the outer tube 118 is reduced, the fuel returning to the inside of the fuel tank 15 from the inner tube 117 is filtered by the mesh screen 122, and thereby clogging of the dust, refuse, and the like in the fuel suction hose 95 can be prevented.

Also, the joint 123 is attached to the bottom portion 15a of the fuel tank 15 at a position apart from the fuel hose joint 116, the joint 123 including the vertically long opening 124 but not including the mesh screen, the vertically long opening 124 being separated into plural numbers, extending long in the up-down direction, and opening to the inside of the fuel tank 15, the breather hose 101 is connected to the joint 123, the breather hose 101 returning the vapor generated in the fuel pump 59 to the fuel tank 15 side and being capable of supplying the fuel from the fuel tank 15 to the fuel pump 59 side, and therefore large impurities can be prevented from entering into the fuel pump 59 from the fuel tank 15 while preventing failure of returning of the vapor gas by the mesh screen.

Also, the secondary filter 60 and the pressure control valve 98 are arranged in the downstream side fuel supply system 93, the secondary filter 60 being disposed in the vicinity of the fuel pump 59 so as to remove the impurities within the fuel that is discharged from the fuel pump 59, the pressure control valve 98 being disposed in the vicinity of the fuel tank 15 so as to guide the excess fuel to the excess fuel return system 94, the excess fuel coming from the downstream side fuel supply system 93; therefore, the disposal space of the secondary filter 60 and the pressure control valve 98 can be secured by dispersed disposal, and the length of the excess fuel return system 94 can be shortened.

Further, although the canister 126 and the evaporated fuel control valve 127 are supported by the body frame F around the fuel tank 15, the canister 126 adsorbing the evaporated fuel coming from the fuel tank 15, the evaporated fuel control valve 127 controlling the flow rate of the evaporated fuel that is purged from the canister 126 and flows through the intake system 41 of the internal combustion engine E, the canister 126 is disposed on the lower side of the imaginary horizontal plane VH that passes the lowermost surface of the fuel tank 15 between the steering shaft 32 and the fuel tank 15, the steering shaft 32 extending in the up-down direction while inclining downward to the front in front of the fuel tank 15, the interval between the steering shaft 32 and the fuel tank 15 becomes large as it goes downward, the steering shaft 32 extending in the up-down direction while inclining downward to the front, and therefore the volume of the canister 126 can be secured while protecting the canister 126 from the outside by the steering shaft 32.

Also, the evaporated fuel control valve 127 is disposed between the steering shaft 32 and the fuel tank 15 and on the upper side of the imaginary horizontal plane VH, and therefore the evaporated fuel control valve 127 and the canister 126 can be disposed around the fuel tank 15 with excellent spatial efficiency while being protected by the steering shaft 32, the evaporated fuel control valve 127 being compact compared to the canister 126.

Also, the bracket 128 is attached to the body frame F through the second and third mount rubbers 129, 130, the bracket 128 being disposed around the fuel tank 15, the canister 126 and the evaporated fuel control valve 127 are commonly supported by the bracket 128; therefore, the space for disposing the canister 126 and the evaporated fuel control valve 127 can be secured easily around the fuel tank 15 to improve assemblability, and the canister 126 and the evaporated fuel control valve 127 can be protected against vibration from the vehicle body side.

Also, the bracket 128 is formed so as to include the first and second support sheet portions 128a, 128b that face the directions different from each other and are formed into a planar shape, the canister 126 is supported on the inner side of the first support sheet portion 128a, the evaporated fuel control valve 127 is supported on the inner side of the second support sheet portion 128b that is adjacent to the first support sheet portion 128a, and therefore the productivity of the bracket 128 can be improved, and the length of the piping can be shortened since the canister 126 and the evaporated fuel control valve 127 are disposed so as to be adjacent to each other.

Also, the bracket 128 includes the first support sheet portion 128a, the first cover support portions 128c, 128d having a flat sheet shape, and the second cover support portions 128e, 128f having a flat sheet shape, the first support sheet portion 128a opposing the side wall 126a having a cylindrical shape of the canister 126, the first cover support portions 128c, 128d being disposed on the outer side of one end wall 126b of the canister 126 and continuing to the first support sheet portion 128a at the right angle, the second cover support portions 128e, 128f being disposed on the outer side of the other end wall 126c of the canister 126 and continuing to the first support sheet portion 128a at the right angle, the cover member 138 is attached to the first cover support portions 128c, 128d and the second cover support portions 128e, 128f, the cover member 138 covering at least a part of the side wall 126a and the opposite end walls 126b, 126c of the canister 126, being made of rubber, and having a flat sheet shape; therefore, the structure of protecting opposite ends of the canister 126 can be achieved by the cover member 138 that has a flat sheet shape, and the cost can be reduced while improving the productivity that is for improving the protection performance.

Also, the body frame F includes the bent portion 17c having a substantial U-shape that opens rearward below the front end portion of the fuel tank 15, the steering shaft 32 is steerably supported by the support portion 29, the steering shaft bracket 28 including the support portion 29 on the front surface of the steering shaft bracket 28, the steering shaft bracket 28 being attached to the bent portion 17c while having a cross-section of a substantial U-shape that opens rearward, the bracket 128 is fastened to the front surface of the fourth stay 147 through the second mount rubber 129 by the seventh bolts 148 and the fifth weld nuts 149, the seventh bolts 148 being apart from each other in the vehicle width direction, the fourth stay 147 being fixed to the lower surface of the steering shaft bracket 28 and extending downward, and therefore the attaching space of the bracket 128 can be reduced, and the assembling workability can be improved.

Also, the external air relief hose 164 is configured to include the first hose 165 and the second hose 166, the external air relief hose 164 being connected to the canister 126, the first hose 165 extending upward from the canister 126 along the steering shaft 32, the second hose 166 being folded back in a substantial U-shape from the upper end of the first hose 165, being inserted into the steering shaft 32, and being held inside the steering shaft 32; therefore, a part of the passage for relieving the external air is configured by a part of the steering shaft 32, thereby the length of the external air relief hose 164 is shortened, the layout is facilitated, and the assemblability also can be improved.

Also, the canister 126 and the evaporated fuel control valve 127 are attached to the bracket 128 so as to configure the evaporated fuel control unit 125 along with the charging hose 156, the first purging hose 158, the second purging hose 159, and the external air relief hose 164 which are connected to the canister 126 and the evaporated fuel control valve 127; therefore, the bracket 128 is configured to be attached to the body frame F, the bracket 128 being attached with, in a sub-assembled state, the canister 126, the evaporated fuel control valve 127, the charging hose 156, the first purging hose 158, the second purging hose 159, and the external air relief hose 164, thereby interruption of connection of the pipe line by other components can be prevented, and the assemblability into the vehicle can be improved.

Although the embodiment of the present invention is explained above, the present invention is not limited to the embodiment described above, and various kinds of design alteration can be effected without deviating from the gist of the present invention.

For example, the present invention can be applied not only to the all terrain vehicle explained in the embodiment described above, but can be widely applied also to saddled vehicles including a two-wheeled motor vehicle and a three-wheeled motor vehicle.

What is claimed is:

1. A fuel supply structure for a saddled vehicle, comprising:
   a fuel tank;
   a fuel pump that is disposed outside the fuel tank so as to supply fuel from the fuel tank to a fuel injection valve provided in an internal combustion engine;
   an upstream side fuel supply system that guides the fuel from the fuel tank to the fuel pump side;
   a downstream side fuel supply system that guides the fuel from the fuel pump to the fuel injection valve side; and
   an excess fuel return system that returns excess fuel from the downstream side fuel supply system to the fuel tank side,
   wherein a fuel hose joint is attached to the fuel tank, and includes:
      a flange portion fixed to a bottom portion of the fuel tank from beneath;
      an insertion tube portion, the insertion tube portion being inserted into the fuel tank;
      a first connection tube portion;
      a second connection tube portion; and
      a bottomed cylindrical portion extending downward from the flange portion and outside the fuel tank,
   wherein the insertion tube portion comprises a dual tube structure extending through the flange portion and extending to the bottomed cylindrical portion, an inner tube being covered by an outer tube in the dual tube structure, the first connection tube portion communicating with an inside of the inner tube and being formed integrally with the flange portion so as to be disposed outside the fuel tank, the second connection tube portion communicating with an inside of the outer tube and being disposed outside the fuel tank,
   wherein the outer tube is fixed to the flange portion,
   wherein the inner tube is fixed to the bottomed cylindrical portion,
   wherein a fuel suction hose that configures a part of the upstream side fuel supply system is connected to one of the first and second connection tube portions, and
   wherein a fuel return hose that configures a part of the excess fuel return system is connected to another of the first and second connection tube portions.

2. The fuel supply structure for a saddled vehicle according to claim 1, wherein the fuel return hose is connected to the first connection tube portion of the fuel hose joint, and
   wherein an upper end outlet opening of the inner tube inside the outer tube is disposed above a lower end of an opening that is arranged in the outer tube.

3. The fuel supply structure for a saddled vehicle according to claim 2, wherein an upper end portion of the outer tube is disposed above the upper end outlet opening of the inner tube, and
   wherein a mesh screen is arranged in a portion above the upper end outlet opening of the inner tube out of the opening.

4. The fuel supply structure for a saddled vehicle according to claim 2, wherein a joint is attached to the bottom portion of the fuel tank at a position apart from the fuel hose joint, the joint including a vertically long opening but being free of a mesh screen, the vertically long opening being separated into plural numbers, extending long in an up-down direction, and opening to an inside of the fuel tank, and
   wherein a breather hose is connected to the joint, the breather hose returning vapor generated in the fuel pump to the fuel tank side and being capable of supplying fuel of the fuel tank to the fuel pump.

5. The fuel supply structure for a saddled vehicle according to claim 1, wherein a secondary filter and a pressure control valve are arranged in the downstream side fuel supply system, the secondary filter being disposed in a vicinity of the fuel pump so as to remove impurities within fuel that is discharged from the fuel pump, the pressure control valve being disposed in a vicinity of the fuel tank so as to guide excess fuel coming from the downstream side fuel supply system to the excess fuel return system.

6. The fuel supply structure for a saddled vehicle according to claim 2, wherein a secondary filter and a pressure control valve are arranged in the downstream side fuel supply system, the secondary filter being disposed in a vicinity of the fuel pump so as to remove impurities within fuel that is discharged from the fuel pump, the pressure control valve being disposed in a vicinity of the fuel tank so as to guide excess fuel coming from the downstream side fuel supply system to the excess fuel return system.

7. The fuel supply structure for a saddled vehicle according to claim 3, wherein a secondary filter and a pressure control valve are arranged in the downstream side fuel supply system, the secondary filter being disposed in a vicinity of the fuel pump so as to remove impurities within fuel that is discharged from the fuel pump, the pressure control valve being disposed in a vicinity of the fuel tank so as to guide excess fuel coming from the downstream side fuel supply system to the excess fuel return system.

8. The fuel supply structure for a saddled vehicle according to claim 4, wherein a secondary filter and a pressure control valve are arranged in the downstream side fuel supply system, the secondary filter being disposed in a vicinity of the fuel pump so as to remove impurities within fuel that is discharged from the fuel pump, the pressure control valve being disposed in a vicinity of the fuel tank so as to guide excess fuel coming from the downstream side fuel supply system to the excess fuel return system.

9. The fuel supply structure for a saddled vehicle according to claim 3, wherein a joint is attached to the bottom portion of the fuel tank at a position apart from the fuel hose joint, the joint including a vertically long opening but being free of a mesh screen, the vertically long opening being separated into plural numbers, extending long in an up-down direction, and opening to an inside of the fuel tank, and wherein a breather hose is connected to the joint, the breather hose returning vapor generated in the fuel pump to the fuel tank side and being capable of supplying fuel of the fuel tank to the fuel pump.

\* \* \* \* \*